(12) United States Patent
Shinohara

(10) Patent No.: US 9,804,371 B2
(45) Date of Patent: Oct. 31, 2017

(54) ZOOM LENS AND IMAGE PICKUP APPARATUS INCLUDING THE SAME

(71) Applicant: CANON KABUSHIKI KAISHA, Tokyo (JP)

(72) Inventor: Kenji Shinohara, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/218,273

(22) Filed: Jul. 25, 2016

(65) Prior Publication Data

US 2017/0045719 A1    Feb. 16, 2017

(30) Foreign Application Priority Data

Aug. 10, 2015  (JP) ................................ 2015-158018

(51) Int. Cl.
    *G02B 15/177*  (2006.01)
    *G02B 27/00*   (2006.01)
    *G02B 15/20*   (2006.01)
    *G02B 13/00*   (2006.01)

(52) U.S. Cl.
    CPC ......... *G02B 15/177* (2013.01); *G02B 13/009* (2013.01); *G02B 15/20* (2013.01); *G02B 27/0025* (2013.01)

(58) Field of Classification Search
    CPC ........ G02B 15/00; G02B 15/14; G02B 15/15; G02B 15/16; G02B 15/163; G02B 15/177; G02B 13/009

USPC .......................................... 359/676–686, 689
See application file for complete search history.

(56) References Cited

U.S. PATENT DOCUMENTS

| 7,830,615 | B2  | 11/2010 | Kanai et al. |
| 8,411,378 | B2  | 4/2013  | Kanbayashi et al. |
| 8,625,209 | B2* | 1/2014  | Sato ................... G02B 15/173 359/716 |
| 2007/0121217 | A1* | 5/2007 | Hozumi ............... G02B 15/177 359/680 |
| 2015/0085377 | A1* | 3/2015 | Suzuki .................. G02B 13/04 359/708 |

FOREIGN PATENT DOCUMENTS

| JP | 2009282466 A | 12/2009 |
| JP | 2011081185 A | 4/2011 |

* cited by examiner

*Primary Examiner* — Darryl J Collins
(74) *Attorney, Agent, or Firm* — Rossi, Kimms & McDowell LLP

(57) ABSTRACT

A zoom lens according to the present invention includes, in order from an object side to an image side: a first lens unit having a negative refractive power; a second lens unit having a positive refractive power; and a third lens unit having a positive refractive power, in which a distance between adjacent lens units varies during zooming, the configuration of the second lens unit, the curvature radius Rb2obj of a lens surface of a cemented lens GRb2 on the object side included in the second lens unit, the curvature radius Rb2img of a lens surface of the cemented lens GRb2 on the image side, the focal length f2bimg of the cemented lens GRb2, and the focal length f2 of the second lens unit are appropriately set.

11 Claims, 13 Drawing Sheets

ZOOM LENS AND IMAGE PICKUP APPARATUS INCLUDING THE SAME

BACKGROUND OF THE INVENTION

Field of the Invention

The present invention relates to a zoom lens and an image pickup apparatus including the same, and particularly, is suitable for image pickup optical systems of image pickup apparatuses, such as a digital still camera, a film camera and a video camera.

Description of the Related Art

In recent years, a zoom lens that has a wide angle of view, a small size and a high aperture ratio has been demanded as an image pickup optical system used for an image pickup apparatus.

A negative-lead type zoom lens where a lens unit having a negative refractive power is disposed nearest to the object side has been known as a zoom lens that is small in size over the entire system and has a wide angle of view and a high aperture ratio. Japanese Patent Application Laid-Open No. 2009-282466 and Japanese Patent Application Laid-Open No. 2011-81185 disclose, as a negative-lead type zoom lens, a three-unit zoom lens that includes, in order from an object side to an image side: a first lens unit having a negative refractive power; a second lens unit having a positive refractive power; and a third lens unit having a positive refractive power.

The negative-lead type three-unit zoom lens including the three lens units described above is advantageous in increase in angle of view and in reduction in size over the entire system. Unfortunately, the entire lens system is asymmetric, which increases variation in various aberrations during zooming. It is thus difficult to obtain high optical characteristics over the entire zoom range.

For achieving high optical characteristics over the entire screen over the entire zoom range while reducing the size over the entire system in a negative-lead type three-unit zoom lens, it is important to appropriately set the refractive power and the lens configuration of each lens unit, and the amount of movement during zooming. For example, to reduce the entire length with the lens retracting, a lens configuration is important that can favorably correct various aberrations while reducing the number of component lenses in each lens unit.

Typically, in a negative-lead type zoom lens, the incident heights of axial rays are highest at the second lens unit over the entire zoom range. Consequently, various aberrations are strong in the second lens unit. For achieving a high aperture ratio and high image quality in a negative-lead type zoom lens, it is important to appropriately set the lens configuration of the second lens unit.

SUMMARY OF THE INVENTION

A zoom lens of the present invention includes, in order from an object side to an image side: a first lens unit having a negative refractive power; a second lens unit having a positive refractive power; and a third lens unit having a positive refractive power, a distance between the adjacent lens units varying during zooming, wherein the second lens unit includes a plurality of lenses, a cemented lens GRb2 including a negative lens and a positive lens that are arranged in order from the object side to the image side and are cemented to each other is disposed nearest to the image side in the second lens unit, and provided that a lens surface of the cemented lens GRb2 on the object side has a curvature radius Rb2obj, a lens surface of this lens on the image side has a curvature radius of Rb2img, the cemented lens GRb2 has a focal length f2bimg, and a focal length of the second lens unit is f2, following conditional expressions are satisfied, $$1.65 < (Rb2obj + Rb2img)/(Rb2obj - Rb2img) < 50.00,$$

and $$1.0 < f2bimg/f2 < 10.0.$$

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Exemplary embodiments of the present invention are hereinafter described in detail with reference to the accompanying drawings. A zoom lens of the present invention includes, in order from an object side to an image side: a first lens unit having a negative refractive power; a second lens unit having a positive refractive power; and a third lens unit having a positive refractive power. The distances between adjacent lens units vary during zooming.

Figure 1:
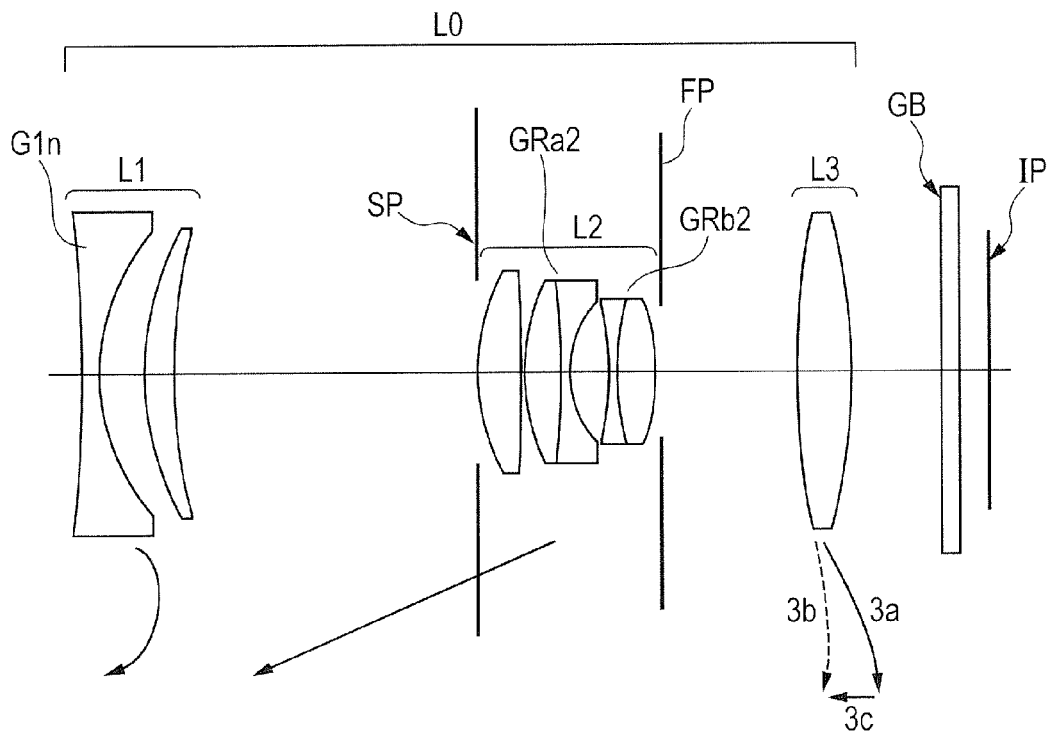
FIG. 1 is a lens sectional view of a zoom lens of Embodiment 1.
Figure 2A:
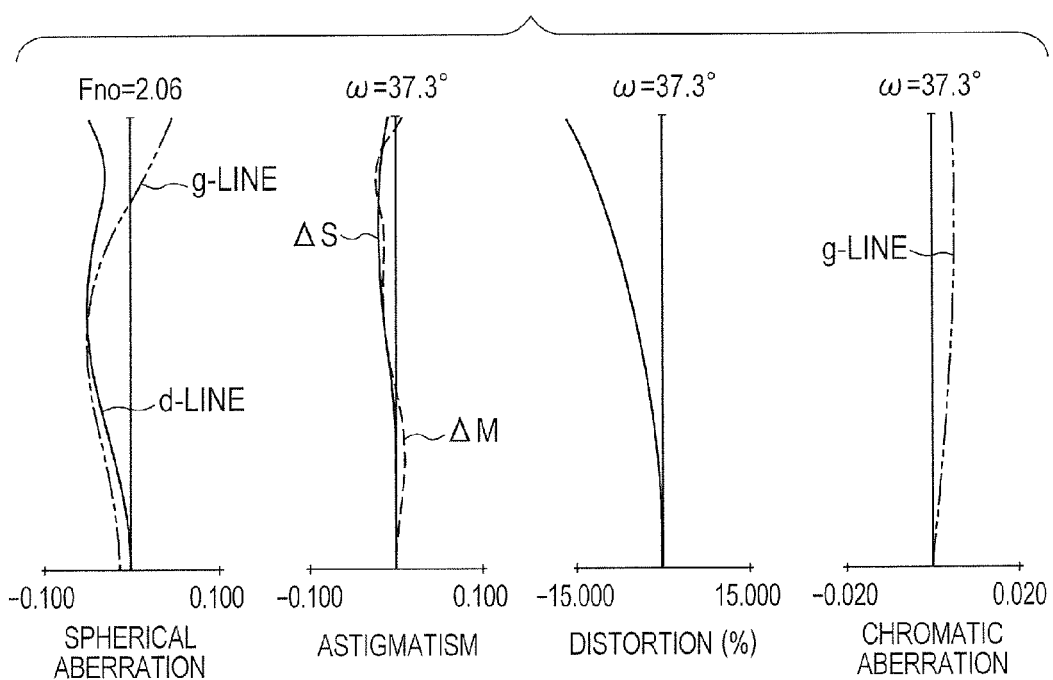
FIG. 2A is an aberration diagram of the zoom lens of Embodiment 1 at a wide angle end.
Figure 2B:
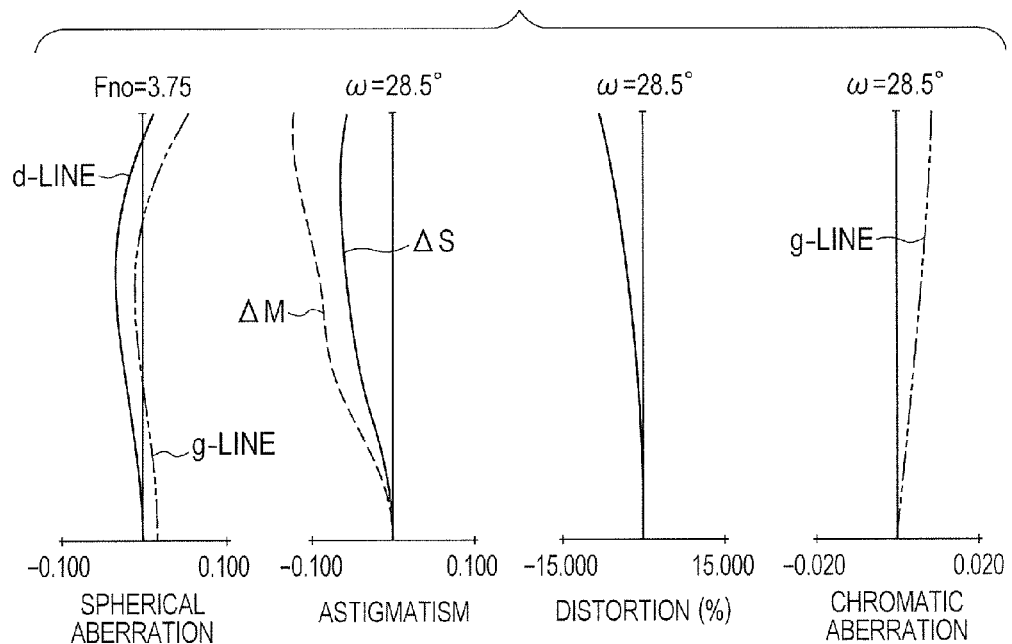
FIG. 2B is an aberration diagram of the zoom lens of Embodiment 1 at an intermediate zoom position.
Figure 2C:
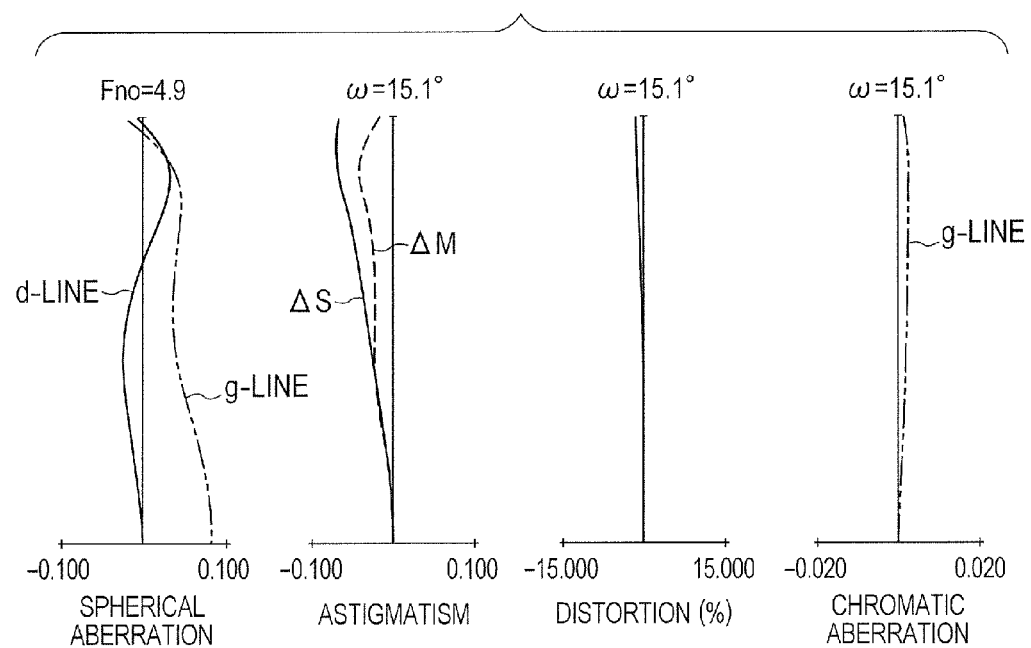
FIG. 2C is an aberration diagram of the zoom lens of Embodiment 1 at a telephoto end.

FIG. 1 is a lens sectional view of a zoom lens of Embodiment 1 at a wide angle end (short focal length end). FIGS. 2A, 2B and 2C are aberration diagrams of the zoom lens of the Embodiment 1 at the wide angle end, an intermediate focal length and a telephoto end (long focal length end), respectively. Embodiment 1 is a zoom lens that substantially has a zoom ratio of 2.88, an aperture ratio of 2.06 to 4.90, and an imaging half angle of view of 32.34 degrees at the wide angle end.

Figure 3:
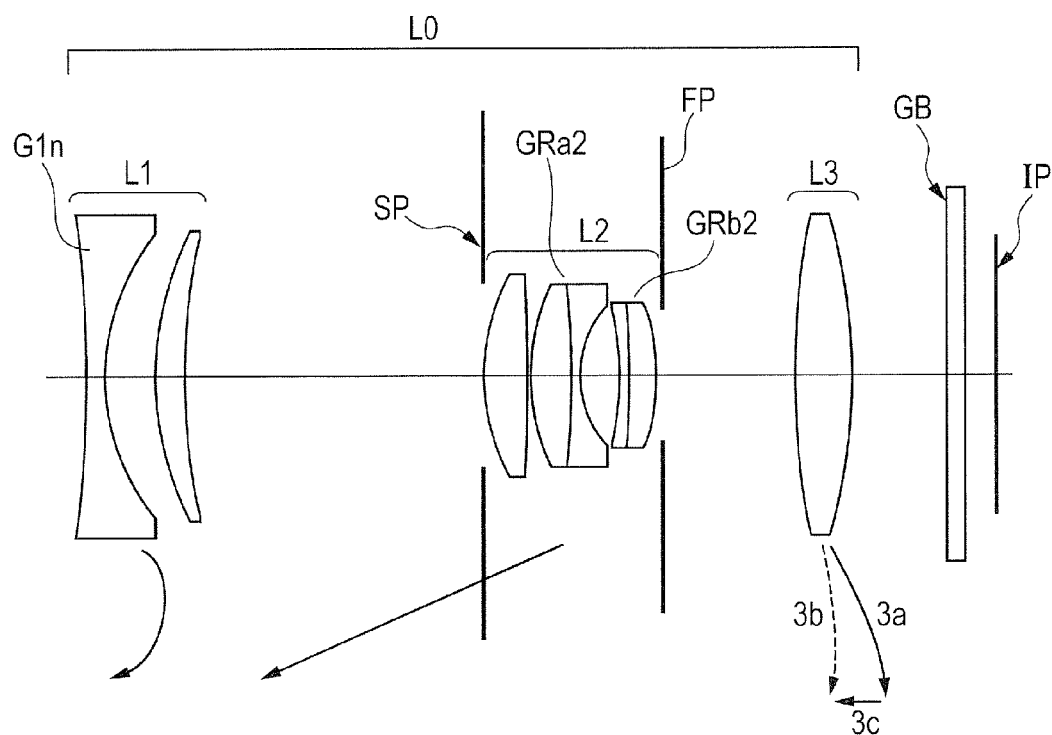
FIG. 3 is a lens sectional view of a zoom lens of Embodiment 2.
Figure 4A:
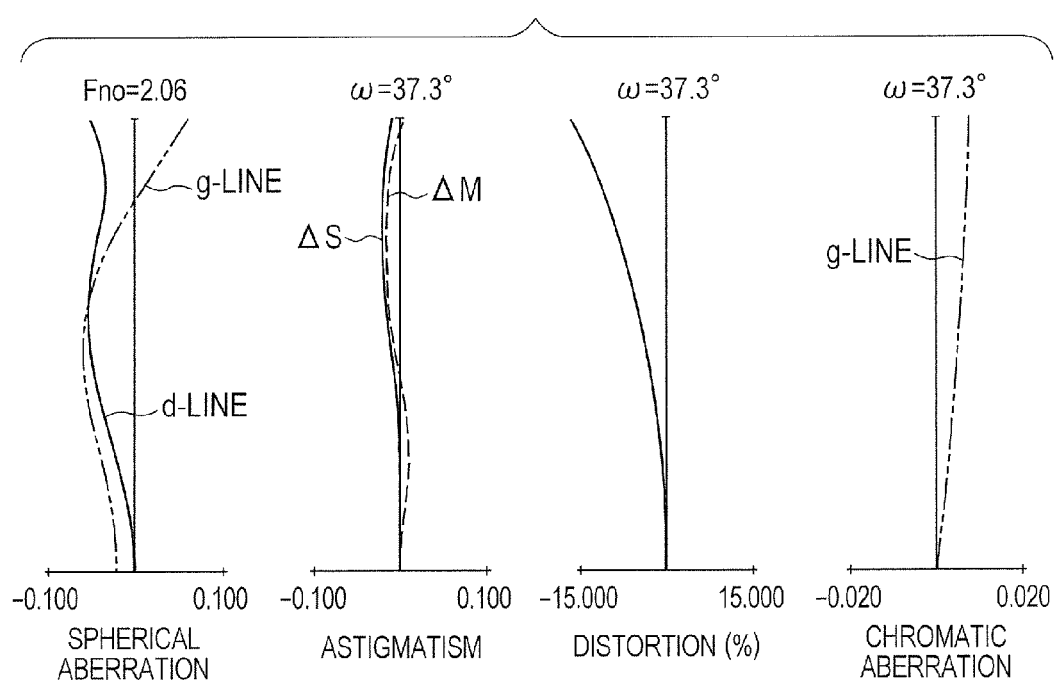
FIG. 4A is an aberration diagram of the zoom lens of Embodiment 2 at a wide angle end.
Figure 4B:
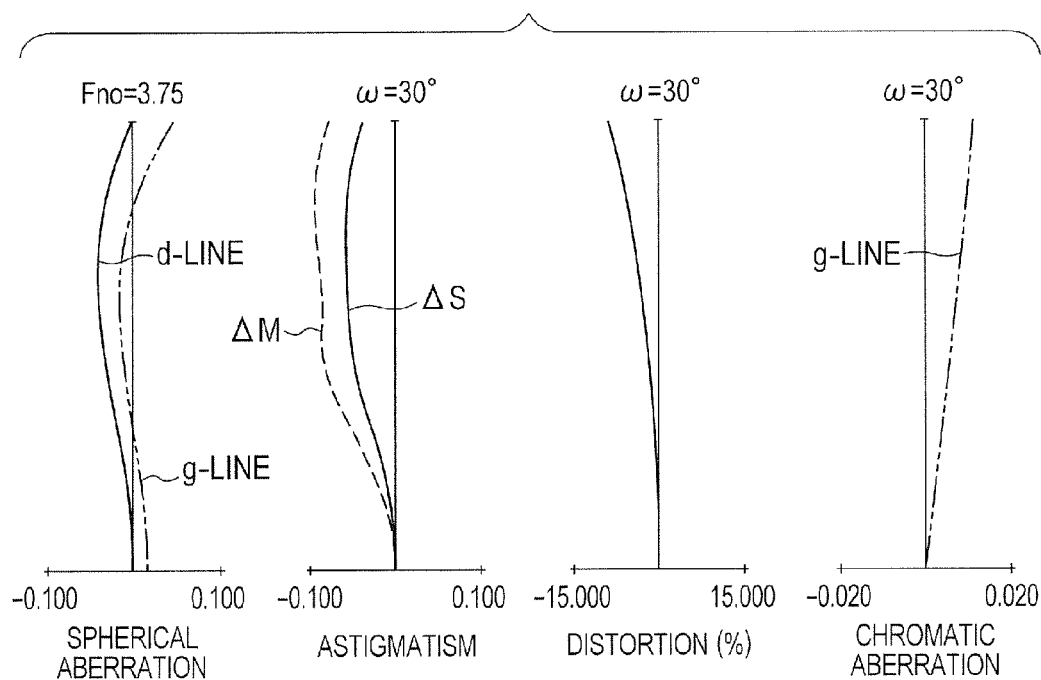
FIG. 4B is an aberration diagram of the zoom lens of Embodiment 2 at an intermediate zoom position.
Figure 4C:
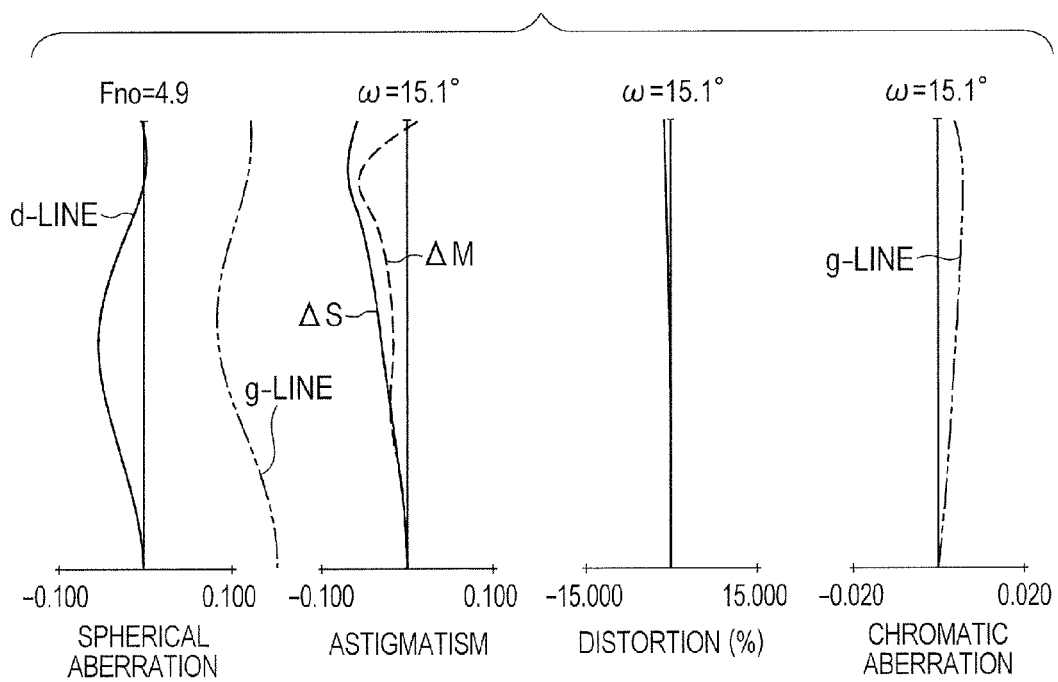
FIG. 4C is an aberration diagram of the zoom lens of Embodiment 2 at a telephoto end.

FIG. 3 is a lens sectional view of a zoom lens of Embodiment 2 at a wide angle end. FIGS. 4A, 4B and 4C are aberration diagrams of the zoom lens of Embodiment 2 at the wide angle end, an intermediate focal length and a telephoto end, respectively. Embodiment 2 is a zoom lens that substantially has a zoom ratio of 2.89, an aperture ratio of 2.06 to 4.90, and an imaging half angle of view of 32.40 degrees at the wide angle end.

Figure 5:
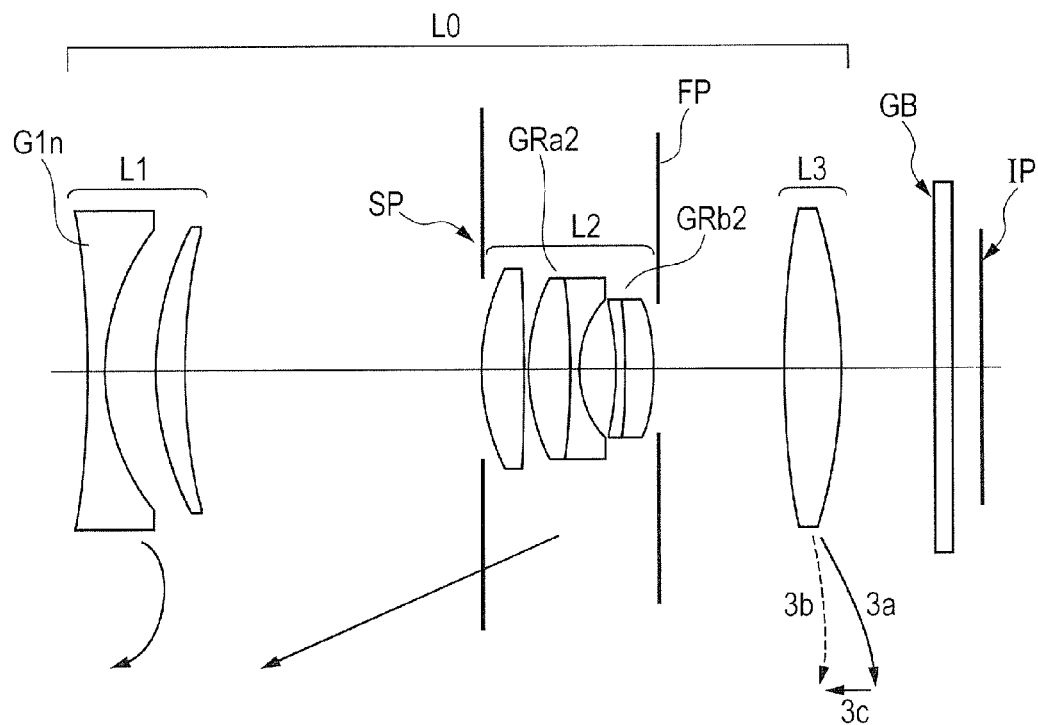
FIG. 5 is a lens sectional view of a zoom lens of Embodiment 3.
Figure 6A:
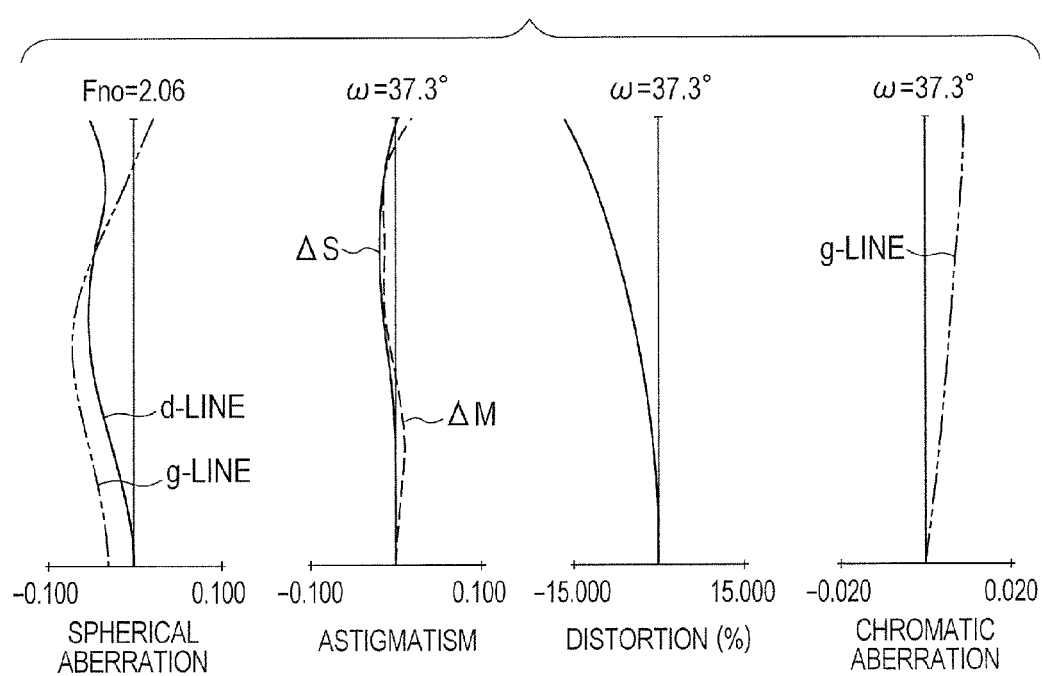
FIG. 6A is an aberration diagram of the zoom lens of Embodiment 3 at a wide angle end.
Figure 6B:
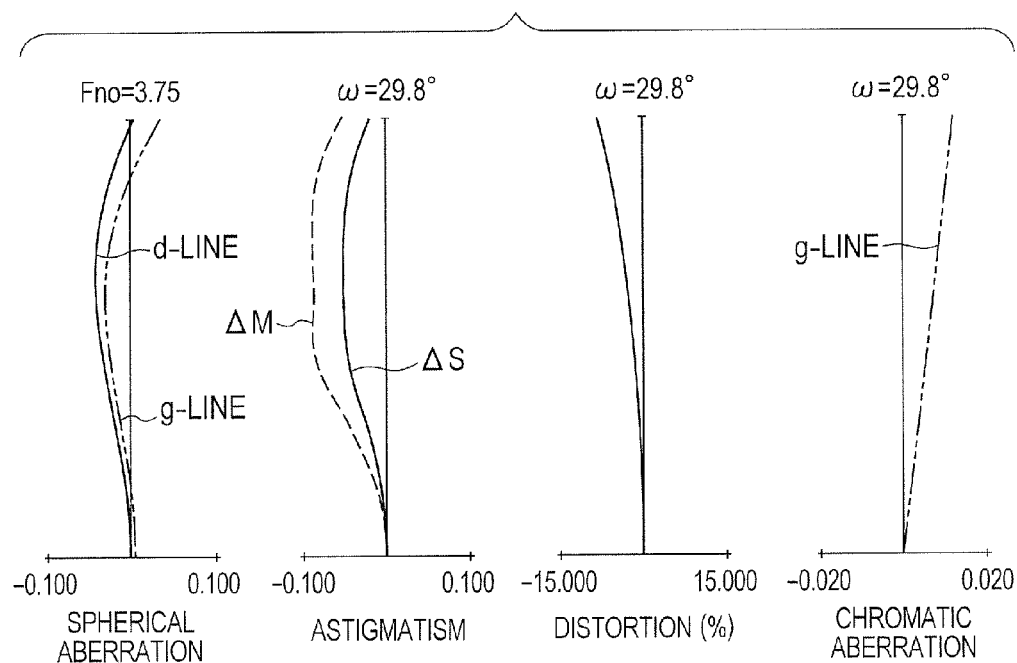
FIG. 6B is an aberration diagram of the zoom lens of Embodiment 3 at an intermediate zoom position.
Figure 6C:
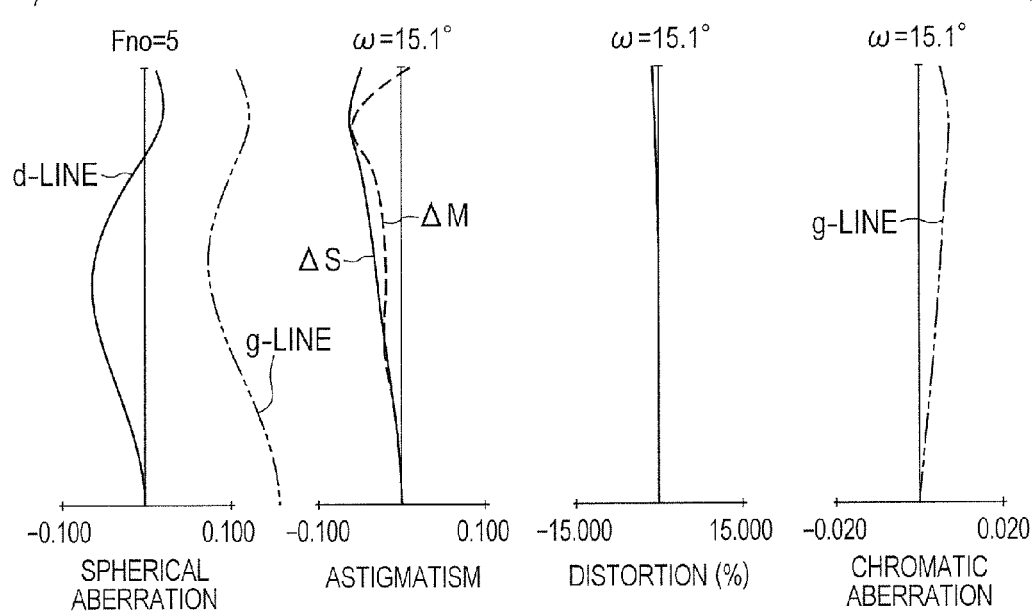
FIG. 6C is an aberration diagram of the zoom lens of Embodiment 3 at a telephoto end.

FIG. 5 is a lens sectional view of a zoom lens of Embodiment 3 at a wide angle end. FIGS. 6A, 6B and 6C are aberration diagrams of the zoom lens of the Embodiment 3 at the wide angle end, an intermediate focal length and the telephoto end, respectively. Embodiment 3 is a zoom lens that substantially has a zoom ratio of 2.89, an aperture ratio of 2.06 to 5.00, and an imaging half angle of view of 32.37 degrees at the wide angle end.

Figure 7:
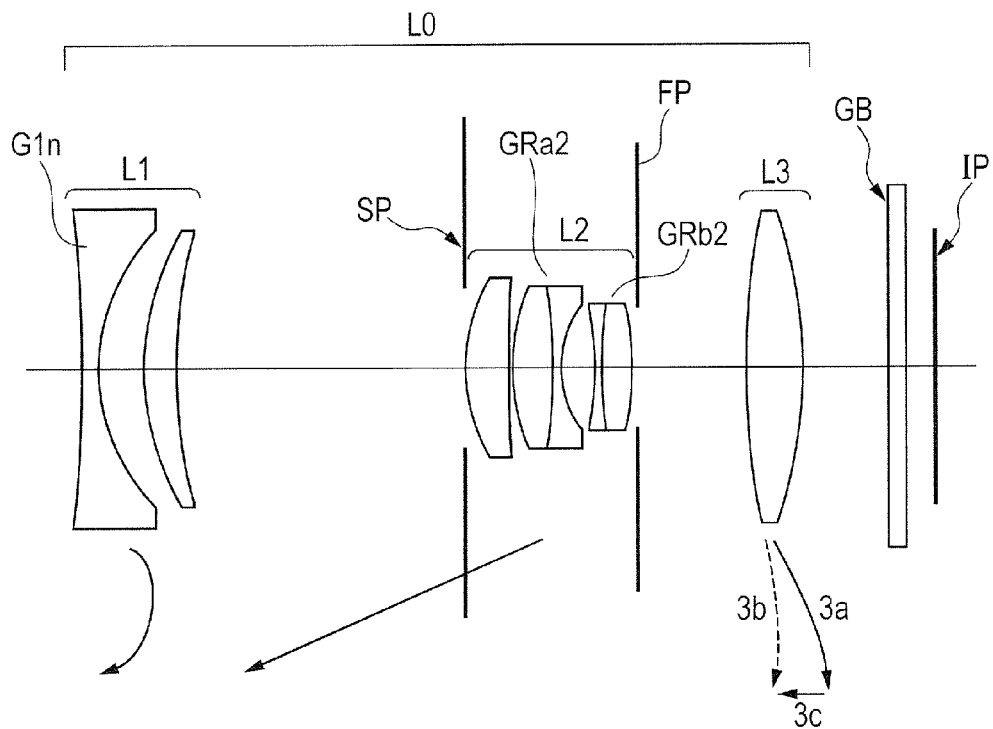
FIG. 7 is a lens sectional view of a zoom lens of Embodiment 4.
Figure 8A:
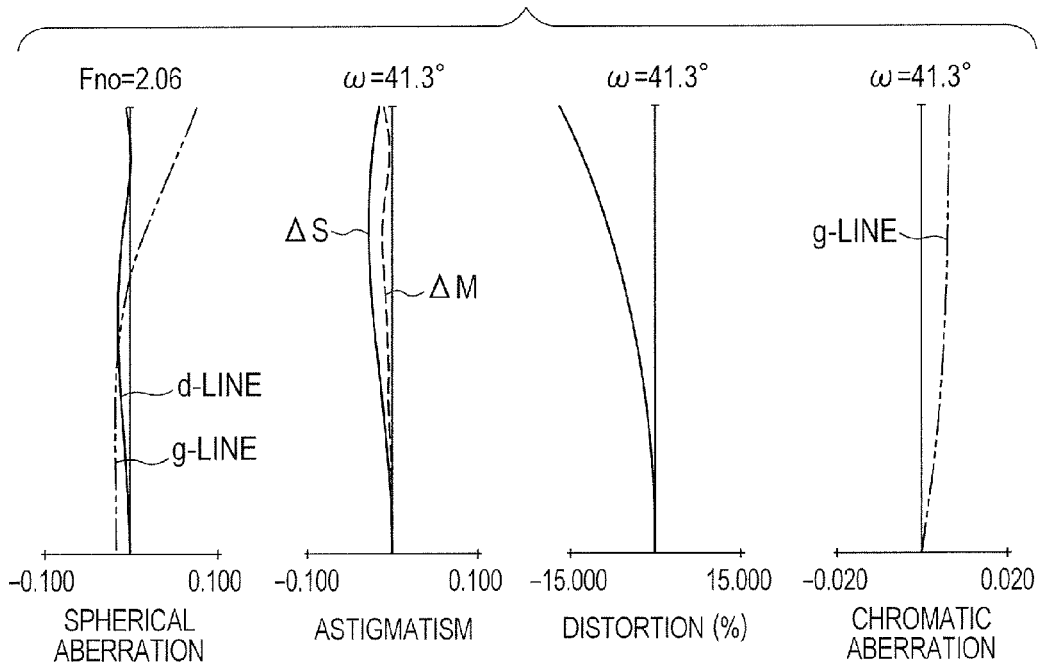
FIG. 8A is an aberration diagram of the zoom lens of Embodiment 4 at a wide angle end.
Figure 8B:
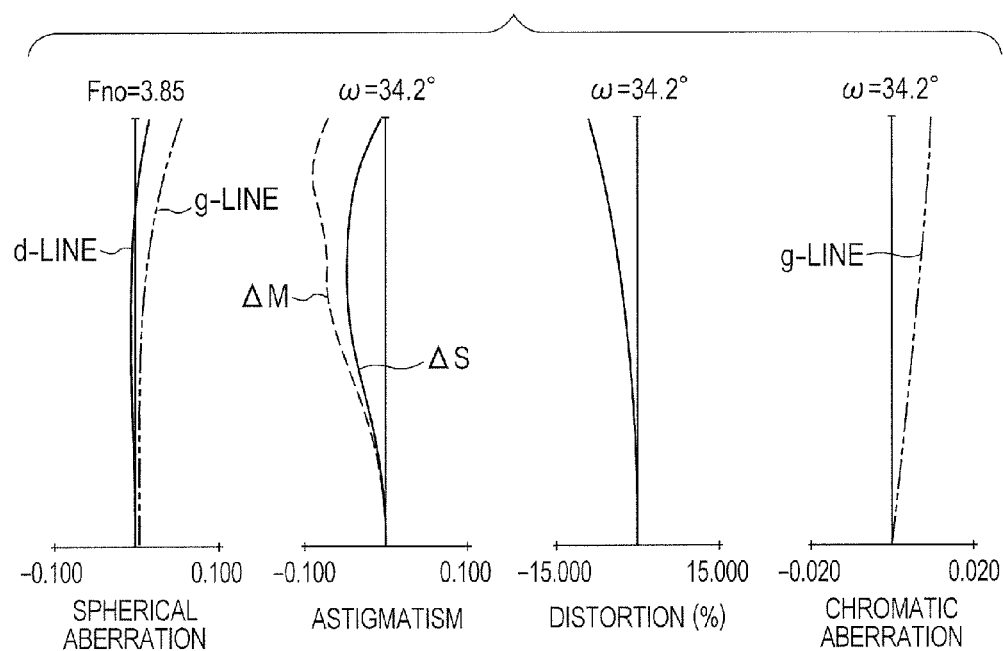
FIG. 8B is an aberration diagram of the zoom lens of Embodiment 4 at an intermediate zoom position.
Figure 8C:
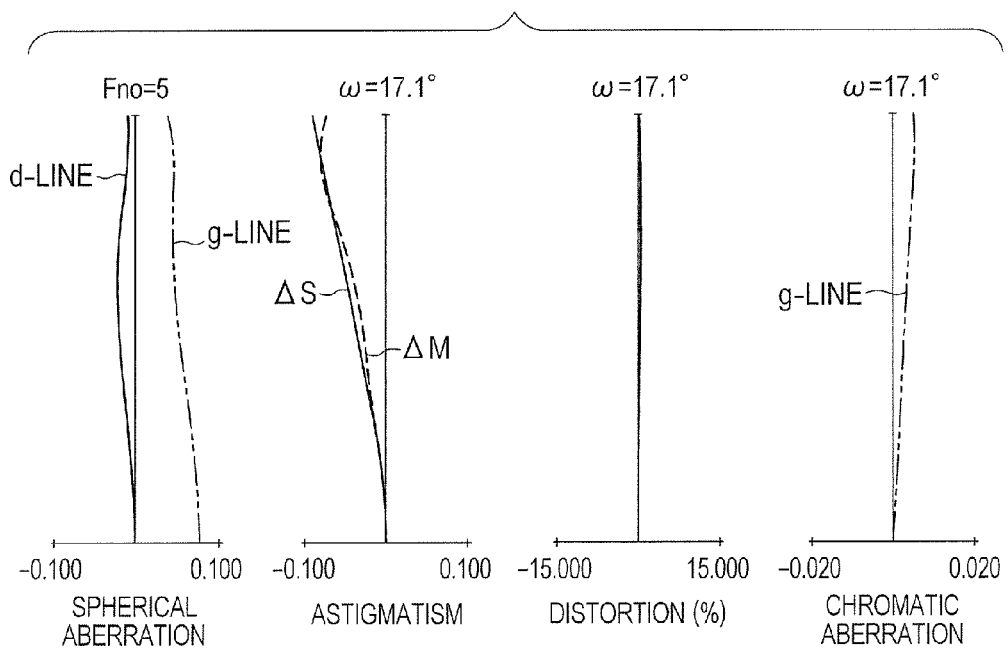
FIG. 8C is an aberration diagram of the zoom lens of Embodiment 4 at a telephoto end.

FIG. 7 is a lens sectional view of a zoom lens of Embodiment 4 at a wide angle end. FIGS. 8A, 8B and 8C are aberration diagrams of the zoom lens of Embodiment 4 at the wide angle end, an intermediate focal length and a telephoto end, respectively. Embodiment 4 is a zoom lens that substantially has a zoom ratio of 2.86, an aperture ratio of 2.06 to 5.00, and an imaging half angle of view of 36.06 degrees at the wide angle end.

Figure 9:
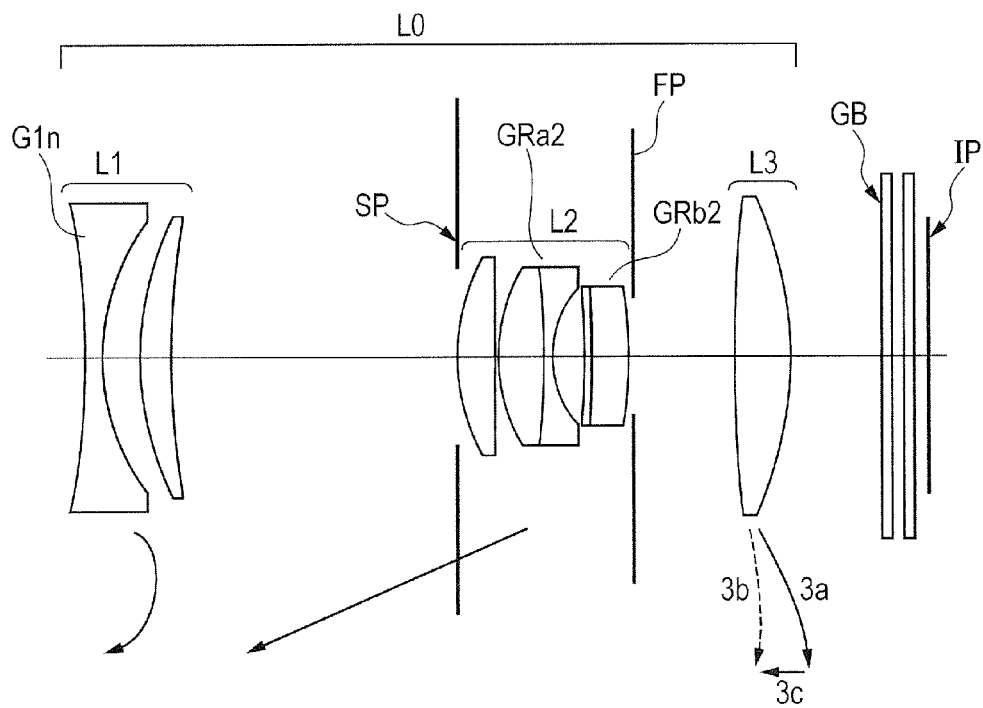
FIG. 9 is a lens sectional view of a zoom lens of Embodiment 5.
Figure 10A:
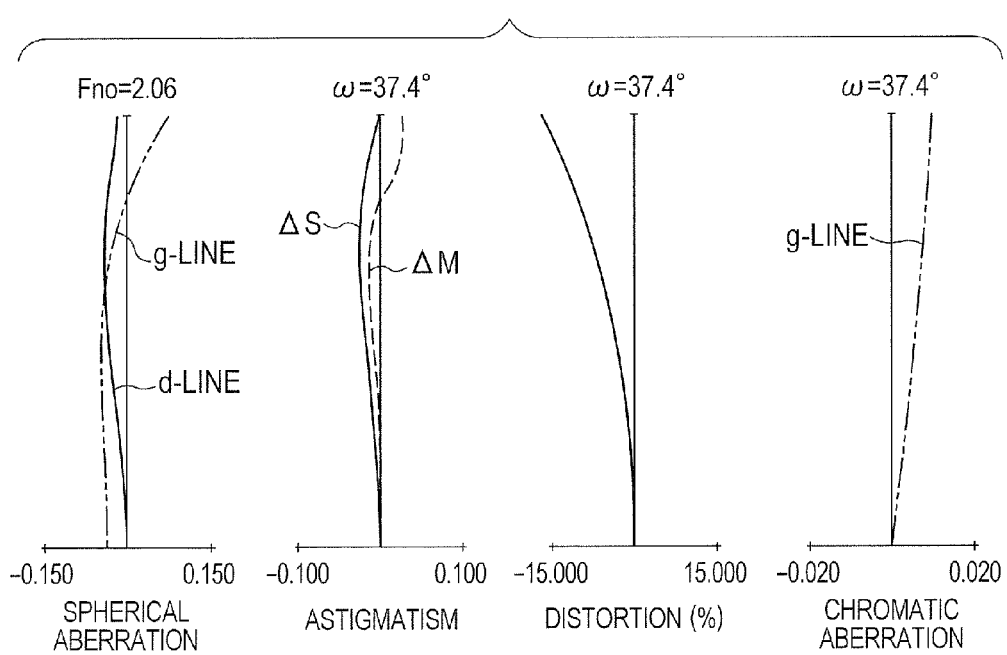
FIG. 10A is an aberration diagram of the zoom lens of Embodiment 5 at a wide angle end.
Figure 10B:
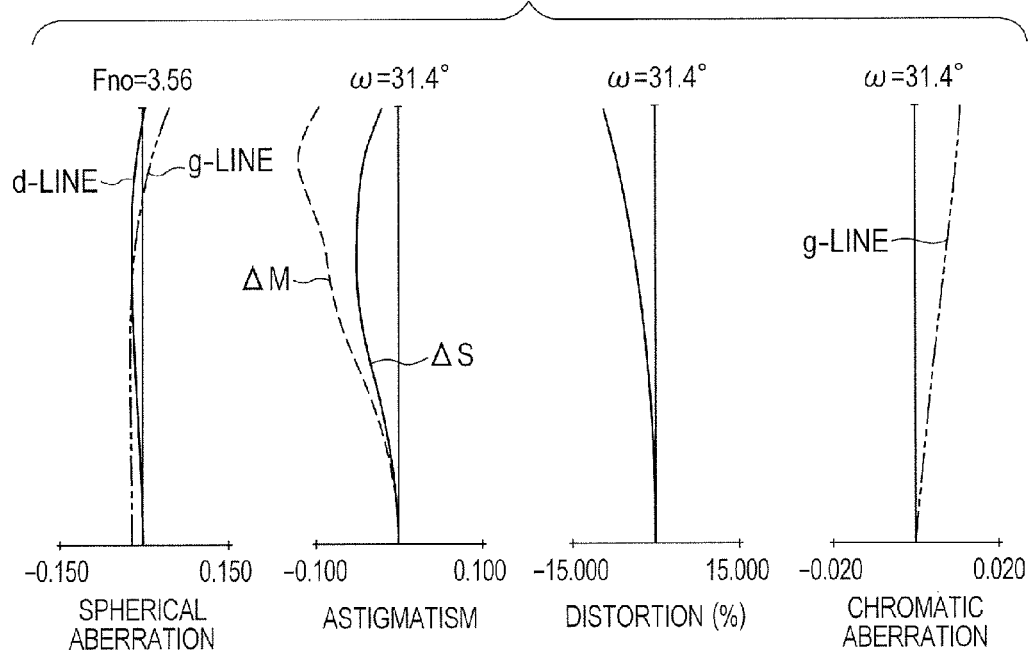
FIG. 10B is an aberration diagram of the zoom lens of Embodiment 5 at an intermediate zoom position.
Figure 10C:
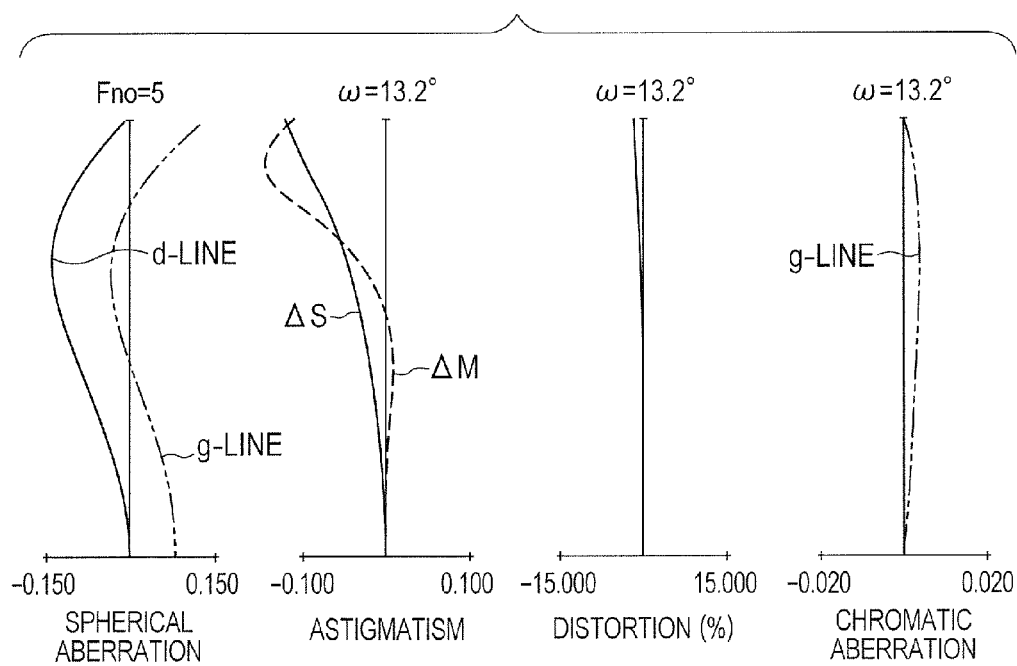
FIG. 10C is an aberration diagram of the zoom lens of Embodiment 5 at a telephoto end.

FIG. 9 is a lens sectional view of a zoom lens of Embodiment 5 at a wide angle end. FIGS. 10A, 10B and 10C are aberration diagrams of the zoom lens of Embodiment 5 at the wide angle end, an intermediate focal length and a telephoto end, respectively. Embodiment 5 is a zoom lens that substantially has a zoom ratio of 3.37, an aperture ratio of 2.06 to 5.00, and an imaging half angle of view of 32.44 degrees at the wide angle end.

Figure 11:
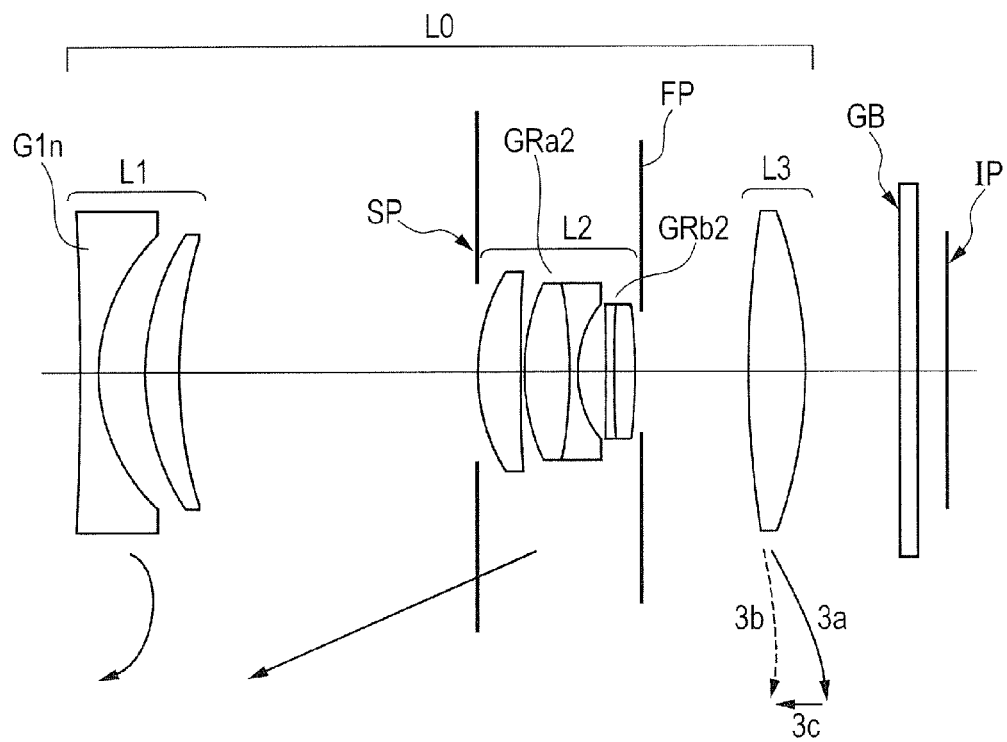
FIG. 11 is a lens sectional view of a zoom lens of Embodiment 6.
Figure 12A:
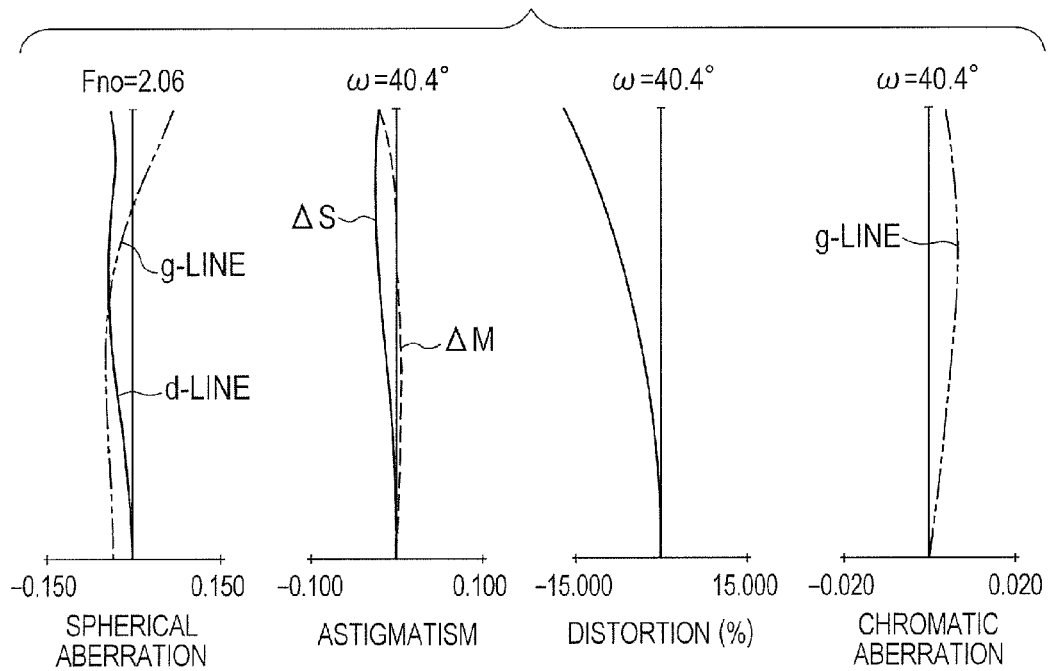
FIG. 12A is an aberration diagram of the zoom lens of Embodiment 6 at a wide angle end.
Figure 12B:
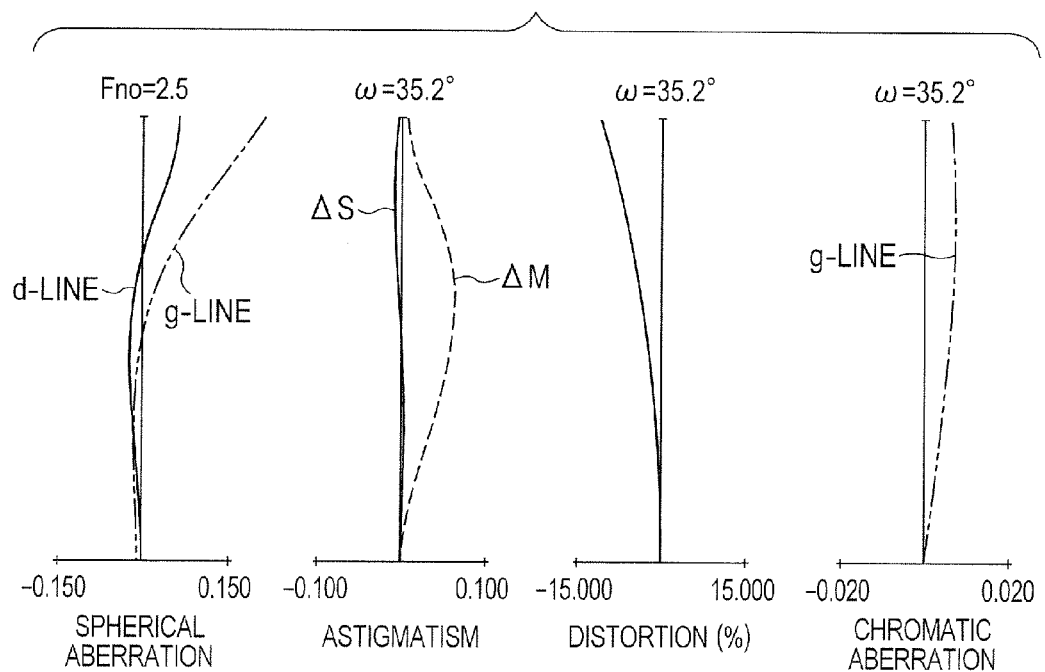
FIG. 12B is an aberration diagram of the zoom lens of Embodiment 6 at an intermediate zoom position.
Figure 12C:
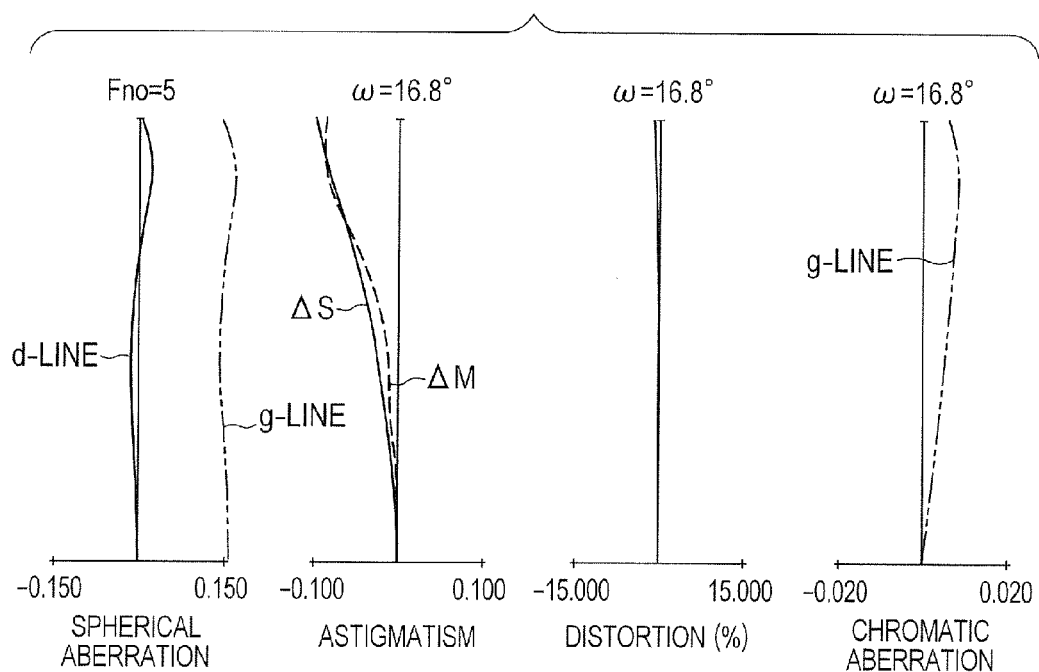
FIG. 12C is an aberration diagram of the zoom lens of Embodiment 6 at a telephoto end.

FIG. 11 is a lens sectional view of a zoom lens of Embodiment 6 at a wide angle end. FIGS. 12A, 12B and 12C are aberration diagrams of the zoom lens of Embodiment 6 at the wide angle end, an intermediate focal length and a telephoto end, respectively. Embodiment 6 is a zoom lens that substantially has a zoom ratio of 2.87, an aperture ratio of 2.06 to 5.00, and an imaging half angle of view of 35.24 degrees at the wide angle end.

Figure 13:
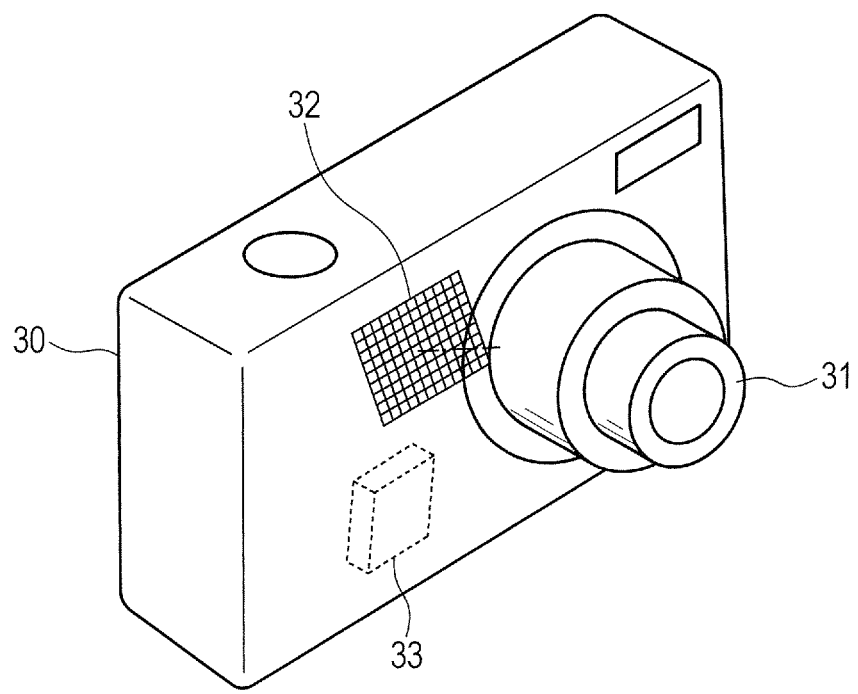
FIG. 13 is an apparatus diagram of an optical apparatus (digital camera) where the zoom lens according to the present invention is mounted.

FIG. 13 is a schematic diagram of a main part of the image pickup apparatus according to the present invention. The zoom lens of each embodiment is an image pickup optical system included in an image pickup apparatus, such as a video camera or a digital camera. In the lens sectional view, the left is the subject side (object side) (front) and the right is the image side (rear). In the lens sectional view, i indicates the order of a lens unit from the object side, and Li denotes an i-th lens unit. An aperture stop SP limits an F-number flux. A flare cut stop FP cuts off harmful light.

An optical block GB corresponds to an optical filter, a face plate, a crystal low-pass filter, an infrared cut-off filter. In the case of use as an imaging optical system of a video camera or a digital still camera, an image pickup plane of a solid-state image pickup element (photo-electric conversion element), such as a CCD sensor or a CMOS sensor, is disposed on an image plane IP.

Among the aberration diagrams, the spherical aberration diagram is illustrated with respect to d-line (wavelength 587.6 nm) and g-line (wavelength 435.8 nm). The astigmatism diagram is illustrated with respect to a meridional image plane $\Delta M$ for d-line and a sagittal image plane $\Delta S$ for d-line. The lateral chromatic aberration is illustrated for g-line. In the diagrams, $\omega$ and Fno denote a half angle of view (degree) and the F-number, respectively. In each of the following embodiments, the wide angle end and the telephoto end are respective zoom positions when a lens unit for varying magnification is disposed at the opposite ends of a range where this unit is mechanically movable on the optical axis.

In each embodiment, during zooming from the wide angle end to the telephoto end, the second lens unit L2 is moved to the object side as indicated by an arrow to vary magnification. The first lens unit L1 is moved along a locus convex to the image side. The third lens unit L3 moves to the image side to thereby correct image plane variation accompanying magnification variation.

Each embodiment adopts a rear focus system that moves the third lens unit L3 on the optical axis for focusing. A solid-line curve 3a and a broken-line curve 3b related to the third lens unit L3 are movement loci to correct image plane variations accompanying magnification variation when an object at infinity and an object at short distance are focused, respectively. As described above, during zooming from the wide angle end to the telephoto end, movement of the third lens unit L3 to the image side effectively utilizes the space between the second lens unit L2 and the third lens unit L3, and obtains a predetermined zoom ratio while reducing the total length of the zoom lens.

Focusing from the object at infinity to the object at short distance at the telephoto end is performed by moving the third lens unit L3 to the object side as indicated by an arrow 3c. The first lens unit L1 is immobile in the optical axis for focusing, but may be moved for correcting aberrations as necessary. The aperture stop SP is disposed on the object side of the second lens unit L2, and moves independently (along a different locus) of the second lens unit L2 during zooming. In image taking, all or a part of the second lens unit L2 may be moved so as to have a component in a direction perpendicular to the optical axis to correct a blur of a subject image (image blurring).

In the zoom lens of each embodiment, the effective image diameter at the wide angle end is smaller than the effective image diameter at the telephoto end. This configuration facilitates high optical characteristics over the entire zoom range.

The zoom lens of the present invention has a wide angle of view and can support a large aperture ratio even with a simple lens configuration, and further has favorable optical characteristics. To increase a large aperture ratio, a positive lead type whose first lens unit has a positive refractive power is advantageous. This type is a zoom type where the light flux diameter tends not to increase at the wide angle end from the front lens (a first lens) to the aperture stop. Unfortunately, this type of zoom lens is prone to have an increased number of lenses as a whole. Consequently, the total length of the zoom lens is long, and the zoom lens has a large thickness in the optical axis with the lens retracting. It is thus difficult to reduce the camera thickness.

On the other hand, there is a negative lead type whose first lens unit has a negative refractive power, as a zoom type that can easily increase the angle of view. This zoom type has a relatively small number of lenses, and can easily achieve a large angle of view with a simple lens configuration. Consequently, the zoom lens of the present invention adopts the negative lead type having the configuration described above.

In the zoom lens of the present invention, the second lens unit is a main magnification variation lens unit having a positive refractive power. The third lens unit has a positive refractive power. The two lens units that are the second lens unit having the positive refractive power and this third lens unit share the total positive refractive power, and reduce occurrence of various aberrations, such as spherical aberration and coma. Meanwhile, in the case where the first lens unit has the negative refractive power, the light flux diameter increases at the second lens unit. Consequently, various aberrations including spherical aberration become strong at the second lens unit, and the optical characteristics are degraded. To favorably correct the various aberrations in this case, the number of lenses is required to be increased.

To achieve a simple lens configuration with a small number of lenses, the present invention adopts the third lens unit with the positive refractive power, and cause this unit to share the total positive refractive power with the second lens unit. In the case where the aperture ratio of the zoom lens is increased, the spherical aberration becomes strong at the wide angle side. In the case where the refractive power of each lens unit is increased to reduce the size of the zoom lens, various aberrations, such as the spherical aberration, coma and chromatic aberration, become strong.

Thus, the second lens unit around the aperture stop where the axial ray expands consists of multiple lenses including a cemented lens. The shape and the refractive power of the cemented lens are appropriately set. This configuration reduces occurrence of various aberrations, such as the spherical aberration, coma and chromatic aberration. More specifically, a cemented lens that has a meniscus shape with a convex surface being oriented toward the image side is disposed nearest to the image side, thereby correcting the coma on the wide angle side. Furthermore, the refractive power is appropriately set to favorably correct the chromatic aberration.

The zoom lens of the present invention has an object to achieve what has a wide angle of view and a large aperture ratio with a simple lens configuration, and further has favorable optical characteristics. Thus, the zoom lens includes, in order from an object side to an image side: a first lens unit L1 having a negative refractive power; a second lens unit L2 having a positive refractive power; and a third lens unit L3 having a positive refractive power.

The second lens unit L2 includes multiple lenses. The cemented lens GRb2 that includes a negative lens and a positive lens arranged in order from the object side to the image side and cemented to each other is disposed nearest to the image side in the second lens unit L2. It is assumed that the lens surface of the cemented lens GRb2 on the object side has a curvature radius Rb2obj, the lens surface on the image side has a curvature radius of Rb2img, the cemented lens GRb2 has a focal length f2bimg, and the second lens unit has a focal length f2. In this case, the following conditional expression is satisfied.

$$1.65 < (Rb2obj + Rb2img)/(Rb2obj - Rb2img) < 50.00 \quad (1)$$

$$1.0 < f2bimg/f2 < 10.0 \quad (2)$$

Next, the technical meaning of the conditional expression is described. In the zoom lens of the present invention, the lens configuration of the second lens unit L2 where the light flux diameter increases, the shape of the cemented lens GRb2 included in the second lens unit L2, and the refractive power of the cemented lens GRb2 are appropriately set.

A conditional expression (1) relates to the shape of the cemented lens GRb2 that is in the second lens unit L2 and is disposed nearest to the image side, and is to correct mainly, favorably the coma in the wide angle side. If (Rb2obj+Rb2img)/(Rb2obj−Rb2img) falls below the lower limit of the conditional expression (1), the meniscus shape of the cemented lens GRb2 becomes weak. Consequently, it becomes difficult to correct the coma at the wide angle side. On the other hand, If (Rb2obj+Rb2img)/(Rb2obj−Rb2img) exceeds the upper limit of the conditional expression (1), the meniscus shape of the cemented lens GRb2 becomes strong. Consequently, this configuration facilitates correction of the coma at the wide angle side, but increases the coma at the telephoto side, which is unfavorable. Furthermore, the thickness of the second lens unit L2 on the optical axis increases, and it becomes difficult to reduce the camera thickness with the entire system retracting.

A conditional expression (2) relates to the positive refractive power of the cemented lens GRb2 disposed nearest to the image side in the second lens unit L2, and is to correct mainly, favorably the chromatic aberration. If f2bimg/f2 falls below the lower limit of the conditional expression (2), the positive refractive power of the cemented lens GRb2 increases. Consequently, it becomes difficult to reduce variation in chromatic aberration during zooming. On the other hand, if f2bimg/f2 exceeds the upper limit of the conditional expression (2), the positive refractive power of the cemented lens GRb2 decreases. Consequently, it becomes difficult to correct the chromatic aberration and the coma at the wide angle side. In each embodiment, for aberration correction, it is further favorable to set the numerical value ranges of the conditional expressions (1) and (2) as follows.

$$1.7 < (Rb2obj + Rb2img)/(Rb2obj - Rb2img) < 40.0 \quad (1a)$$

$$1.5 < f2bimg/f2 < 8.0 \quad (2a)$$

It is further favorable to set the numerical value ranges of the conditional expressions (1a) and (2a) as follows.

$$1.7 < (Rb2obj + Rb2img)/(Rb2obj - Rb2img) < 30.0 \quad (1b)$$

$$2.0 < f2bimg/f2 < 6.0 \quad (2b)$$

It is favorable to satisfy at least one of the following conditional expressions in each embodiment. It is assumed that the lens surface of the negative lens on the object side included in the cemented lens GRb2 has a curvature radius Rb2n_obj and the lens surface on the image side has a curvature radius Rb2n_img. In zooming from the wide angle end to the telephoto end, the amount of movement M2 of the second lens unit L2 and the amount of movement M3 of the third lens unit L3 are assumed. The sign of the amount of movement is positive in the case where the position is nearer to the object side at the telephoto end than the wide angle end as a result of movement due to zooming from the wide angle end to the telephoto end; the sign is negative in the case of being nearer to the image side.

It is assumed that the second lens unit L2 has a focal length f2, and the third lens unit L3 has a focal length f3. The second lens unit L2 includes, in order from the object side to the image side: a positive lens; a cemented lens GRa2 including a positive lens and a negative lens cemented to each other; and a cemented lens GRb2 including a negative lens and a positive lens cemented to each other. In this case, it is assumed that the lens surface of the negative lens on the object side included in the cemented lens GRa2 has a curvature radius Ra2n_obj and the lens surface on the image side has a curvature radius Ra2n_img. A negative lens G1n is disposed nearest to the object side in the first lens unit L1. The lens surface of the negative lens G1n on the object side has a curvature radius RG1obj and the lens surface on the image side has a curvature radius RG1img.

It is assumed that the lens surface of the positive lens on the object side included in the cemented lens GRb2 has a curvature radius Rb2p_obj and the lens surface on the image side has a curvature radius Rb2p_img. It is assumed that the lens surface of the cemented lens GRa2 on the image side has a curvature radius Ra2n_img and the lens surface of the cemented lens GRb2 on the object side has a curvature radius Rb2n_obj. It is appropriate to satisfy at least one of the following conditional expressions.

$$-4.5 < (Rb2n\_obj + Rb2n\_img)/(Rb2n\_obj - Rb2n\_img) < 0.2 \quad (3)$$

$$-18.0 < M2/M3 < -7.0 \quad (4)$$

$$0.30 < f2/f3 < 0.65 \quad (5)$$

$$0.2 < (Ra2n\_obj + Ra2n\_img)/(Ra2n\_obj - Ra2n\_img) < 1.2 \quad (6)$$

$$0.4 < (RG1obj + RG1img)/(RG1obj - RG1img) < 1.0 \quad (7)$$

$$0.01 < (Rb2p\_obj + Rb2p\_img)/(Rb2p\_obj - Rb2p\_img) < 2.50 \quad (8)$$

$$-1.0 < (Ra2n\_img + Rb2n\_obj)/(Ra2n\_img - Rb2n\_obj) < -0.3 \quad (9)$$

Next, the technical meaning of each conditional expression is described. A conditional expression (3) relates to the lens shape of the negative lens included in the cemented lens GRb2 in the second lens unit L2, and is to correct mainly, favorably the coma. If (Rb2n_obj+Rb2n_img)/(Rb2n_obj−Rb2n_img) falls below the lower limit of the conditional expression (3), the lens shape of the negative lens has a meniscus shape whose concave surface having a strong refractive power is oriented to the object side. Consequently, this configuration facilitates correction of the coma at the wide angle side. It is however becomes difficult to correct the coma on the telephoto end.

On the other hand, if (Rb2n_obj+Rb2n_img)/(Rb2n_obj−Rb2n_img) exceeds the upper limit of the conditional expression (3), the lens shape of the negative lens approaches a biconcave shape. Consequently, the entire thickness (central thickness) of the cemented lens GRb2 becomes too large. It is therefore becomes difficult to reduce the camera thickness with the entire system retracting.

The conditional expression (4) relates to the ratio between the amount of movement of the second lens unit L2 and the amount of movement of the third lens unit L3 during zooming, and mainly to the total length of the zoom lens. If M2/M3 falls below the lower limit of the conditional expression (4) and the amount of movement of the second lens unit L2 becomes large, a high zoom ratio can easily obtained but the variations in chromatic aberration and coma during zooming become large. It is therefore becomes difficult to correct these various aberrations. Furthermore, the variation in F-number becomes large during zooming. Consequently, the configuration is unfavorable.

On the other hand, if M2/M3 exceeds the upper limit of the conditional expression (4) and the amount of movement of the third lens unit L3 becomes large, a predetermined amount of back focus is required to be secured at the telephoto end, which increases the total length of the zoom lens. Consequently, it is difficult to achieve reduction in size of the entire system. Furthermore, the variation in field curvature becomes large during zooming and focusing. Consequently, the configuration is unfavorable.

The conditional expression (5) relates to the ratio between the positive refractive power of the second lens unit L2 and the positive refractive power of the third lens unit L3, and is mainly to reduce variation in optical characteristics during zooming. If f2/f3 falls below the lower limit of the conditional expression (5) and the positive refractive power of the second lens unit L2 increases, the predetermined zoom ratio can be easily obtained. However, variation in various aberrations, such as the spherical aberration, axial chromatic aberration and coma, increase during zooming. It is thus becomes difficult to correct the various aberrations.

On the other hand, if f2/f3 exceeds the upper limit of the conditional expression (5) and the refractive power of the third lens unit L3 increases, the amount of movement of the third lens unit L3 during focusing decreases. Consequently, this configuration facilitates reduction in size of the entire system. It is however becomes difficult to secure a predetermined amount of back focus at the wide angle side.

A conditional expression (6) relates to the lens shape of the negative lens included in the cemented lens GRa2 arranged on the object side in the second lens unit L2, and is to correct mainly, favorably the axial chromatic aberration and the coma. If (Ra2n_obj+Ra2n_img)/(Ra2n_obj−Ra2n_img) falls below the lower limit of the conditional expression (6), the meniscus shape of the negative lens becomes weak. Consequently, the coma increases. On the other hand, If (Ra2n_obj+Ra2n_img)/(Ra2n_obj−Ra2n_img) exceeds the upper limit of the conditional expression (6), the lens shape of the negative lens approaches a meniscus shape. Consequently, the axial chromatic aberration increases, and it becomes difficult to correct this aberration.

A conditional expression (7) relates to the lens shape of the negative lens G1n included in the first lens unit L1, and is to correct mainly, favorably the field curvature and distortion at the wide angle side. If (RG1obj+RG1img)/(RG1obj−RG1img) falls below the lower limit of the conditional expression (7), the lens shape of the negative lens G1n approaches a biconcave shape. Consequently, the image pickup angle of view can be easily increased. However, the distortion increases at the wide angle side. It becomes difficult to correct the distortion. On the other hand, If (RG1obj+RG1img)/(RG1obj−RG1img) exceeds the upper limit of the conditional expression (7), the lens shape of the negative lens G1n approaches a meniscus shape. Consequently, the field curvature can be easily corrected. It however becomes difficult to increase the angle of view.

A conditional expression (8) relates to the lens shape of the positive lens included in the cemented lens GRb2 in the second lens unit L2, and is to correct mainly reduce the size of the positive lens. If (Rb2p_obj+Rb2p_img)/(Rb2p_obj−Rb2p_img) falls below the lower limit of the conditional expression (8), the lens shape of the positive lens becomes a strong biconvex shape. Consequently, the thickness of the cemented lens GRb2 on the optical axis increases, and the camera thickness with the entire system retracting increases. Consequently, the configuration is unfavorable. On the other hand, If (Rb2$p$_obj+Rb2$p$_img)/(Rb2$p$_obj−Rb2$p$_img) exceeds the upper limit of the conditional expression (8), the lens shape of the positive lens approaches a meniscus shape. Consequently, the thickness of the positive lens can be easily reduced. However, the coma increases on the telephoto side. It becomes difficult to correct the coma.

A conditional expression (9) relates to an air lens formed by the cemented lens GRa2 and the cemented lens GRb2 included in the second lens unit L2, and is to correct mainly, favorably the coma. If (Ra2$n$_img+Rb2$n$_obj)/(Ra2$n$_img−Rb2$n$_obj) falls below the lower limit of the conditional expression (9), the shape of the air lens approaches a meniscus shape. Consequently, it becomes difficult to correct the coma at the wide angle side. On the other hand, if (Ra2$n$_img+Rb2$n$_obj)/(Ra2$n$_img−Rb2$n$_obj) exceeds the upper limit of the conditional expression (9), the biconvex shape of the air lens becomes strong. Consequently, it becomes difficult to correct the coma at the telephoto side. Furthermore, the thickness of the second lens unit L2 on the optical axis increases, and the camera thickness with the entire system retracting increases. Consequently, this configuration is unfavorable.

In each embodiment, for aberration correction, it is further favorable to set the numerical value ranges of the conditional expressions (3) to (9) as follows.

$$-4.3<(\text{Rb2}n\_\text{obj}+\text{Rb2}n\_\text{img})/(\text{Rb2}n\_\text{obj}-\text{Rb2}n\_\text{img})<0.18 \tag{3a}$$

$$-17.0<M2/M3<-7.5 \tag{4a}$$

$$0.35<f2/f3<0.63 \tag{5a}$$

$$0.3<(\text{Ra2}n\_\text{obj}+\text{Ra2}n\_\text{img})/(\text{Ra2}n\_\text{obj}-\text{Ra2}n\_\text{img})<1.1 \tag{6a}$$

$$0.45<(\text{RG1obj}+\text{RG1img})/(\text{RG1obj}-\text{RG1img})<0.95 \tag{7a}$$

$$0.03<(\text{Rb2}p\_\text{obj}+\text{Rb2}p\_\text{img})/(\text{Rb2}p\_\text{obj}-\text{Rb2}p\_\text{img})<2.45 \tag{8a}$$

$$-0.98<(\text{Ra2}n\_\text{img}+\text{Rb2}n\_\text{obj})/(\text{Ra2}n\_\text{img}-\text{Rb2}n\_\text{obj})<-0.32 \tag{9a}$$

It is further favorable to set the numerical value ranges of the conditional expressions (3a) to (9a) as follows.

$$-4.1<(\text{Rb2}n\_\text{obj}+\text{Rb2}n\_\text{img})/(\text{Rb2}n\_\text{obj}-\text{Rb2}n\_\text{img})<0.16 \tag{3b}$$

$$-16.0<M2/M3<-8.0 \tag{4b}$$

$$0.40<f2/f3<0.60 \tag{5b}$$

$$0.4<(\text{Ra2}n\_\text{obj}+\text{Ra2}n\_\text{img})/(\text{Ra2}n\_\text{obj}-\text{Ra2}n\_\text{img})<1.0 \tag{6b}$$

$$0.5<(\text{RG1obj}+\text{RG1img})/(\text{RG1obj}-\text{RG1img})<0.9 \tag{7b}$$

$$0.05<(\text{Rb2}p\_\text{obj}+\text{Rb2}p\_\text{img})/(\text{Rb2}p\_\text{obj}-\text{Rb2}p\_\text{img})<2.40 \tag{8b}$$

$$-0.95<(\text{Ra2}n\_\text{img}+\text{Rb2}n\_\text{obj})/(\text{Ra2}n\_\text{img}-\text{Rb2}n\_\text{obj})<-0.35 \tag{9b}$$

In each embodiment, the lens units are configured as described above. Consequently, the zoom lens is obtained that easily supports a wide angle of view and a large aperture ratio even with a simple lens configuration, and has high optical characteristics.

Next, the lens configuration of each lens unit of the zoom lens in each embodiment is described. The first lens unit L1 includes a biconcave negative lens, and a meniscus-shaped positive lens whose surface on the object side is convex. In the zoom lens of each embodiment, the negative refractive power of the first lens unit L1 is increased in an appropriate range to reduce the size of the entire system. In this case, various aberrations caused in the first lens unit L1, the distortion and the field curvature become strong particularly at the wide angle end. Thus, each embodiment adopts the lens configuration that allows the distortion caused by the first lens unit L1 but corrects the field curvature.

The second lens unit L2 includes a positive lens that has a biconvex shape and includes aspheric surface, and a cemented lens GRa2 that includes a positive lens whose surface on the object side has a convex shape and a negative lens whose surface on the image side has a concave shape, the positive and negative lenses being cemented to each other. This unit further includes a cemented lens GRb2 that includes a negative lens whose surface on the object side has a concave shape and a positive lens whose surface on the image side has a convex shape, the negative and positive lenses being cemented to each other. In the zoom lens of each embodiment, the positive refractive power of the second lens unit L2 is increased in an appropriate range to secure favorable optical characteristics. In this case, the second lens unit L2 causes strong various aberrations, in particular, the spherical aberration, coma, and axial chromatic aberration.

Thus, in each embodiment, a positive lens where the refractive index of the material exceeds 1.8 and which includes an aspheric surface is disposed nearest to the object side, thereby reducing occurrence of the spherical aberration. The positive refractive power of the second lens unit L2 is shared by the three positive lenses, which are the positive lens, the positive lens included in the cemented lens GRa2 having a negative refractive power, and the positive lens included in the cemented lens GRb2 having a positive refractive power, thereby reducing occurrence of the spherical aberration, and coma. Furthermore, adoption of the two cemented lenses alleviates occurrence of the axial chromatic aberration.

The third lens unit L3 consists of a biconvex positive lens. In the zoom lens in each embodiment, the third lens unit L3 is configured by a small number of lenses, thereby facilitating reduction in thickness of the entire system and in weight. In particular, the positive lens has the convex shape on the object side, thereby reducing variation in field curvature during focusing from the infinity to the close range at the telephoto end.

Next, an embodiment of an image pickup apparatus (digital camera) that adopts the zoom lens of the present invention as an image pickup optical system is described with reference to FIG. 13. FIG. 13 illustrates a camera body 30, an image pickup optical system 31 configured by any of the zoom lenses described in Embodiments 1 to 6. A solid-state image pickup element 32 (photo-electric conversion element), such as a CCD sensor or a CMOS sensor, is embedded in the camera body, and receives light of a subject image formed by the image pickup optical system 31. A memory 33 records information corresponding to a subject image photoelectrically converted by the solid-state image pickup element 32.

The zoom lens of the present invention is thus applied to the image pickup apparatus, such as a digital still camera or a video camera. This application can achieve the image pickup apparatus that is small in size and has high optical characteristics. The zoom lens of each embodiment may be used as a projection optical system of a projection apparatus (projector).

Next, numerical value data 1 to 6 corresponding to respective Embodiments 1 to 6 are listed. In each numerical value data, i denotes the order of a surface from the object. ri denotes the curvature radius of a lens surface. di denotes the distance between the i-th surface and (i+1)-th surface. ndi and νdi denote the refractive index and the Abbe number of an i-th optical member, respectively, with reference to d-line. r5 indicates a virtual surface (dummy surface) used for design. In Embodiments 1, 2, 3 and 5, the value of the distance d6 at the telephoto end is negative, because the elements are counted in order from the aperture stop SP to the second lens unit L2. The aspheric surface shape is represented using the displacement x in the optical axis direction at the position with a height h from the optical axis with reference to the surface apex.

In this case, the representation is as follows.

$$x=(h^2/R)/[1+\{1-(1+K)(h/R)^2\}^{1/2}]+A4h^4+A6h^6+A8h^8+A10h^{10}+A12h^{12},$$

where K is the conic constant, A4, A6, A8, A10 and A12 are fourth, sixth, eighth, tenth and twelfth order aspheric surface coefficients, respectively, and R is the paraxial curvature radius. Furthermore, "e-X" means "x10$^{-X}$". The aspheric surface is assigned a symbol * at the right of the surface number in each table. The relationships between the above described conditional expressions and the embodiments are listed in Table 1.

Embodiment 1

Unit mm

Surface data

| Surface number | r | d | nd | νd |
|---|---|---|---|---|
| 1* | −101.530 | 1.00 | 1.85135 | 40.1 |
| 2* | 11.563 | 2.59 | | |
| 3 | 17.158 | 1.68 | 2.00272 | 19.3 |
| 4 | 34.327 | (Variable) | | |
| 5 | ∞ | 0.00 | | |
| 6 (Stop) | ∞ | (Variable) | | |
| 7* | 11.513 | 2.45 | 1.88202 | 37.2 |
| 8* | −158.863 | 0.20 | | |
| 9 | 12.241 | 2.10 | 1.88300 | 40.8 |
| 10 | −46.577 | 0.50 | 1.85478 | 24.8 |
| 11 | 6.040 | 2.24 | | |
| 12 | −17.396 | 0.50 | 1.80610 | 33.3 |
| 13 | 15.807 | 2.21 | 1.85135 | 40.1 |
| 14* | −13.421 | 0.37 | | |
| 15 | ∞ | (Variable) | | (Flare cut stop) |
| 16 | 44.289 | 3.17 | 1.59201 | 67.0 |
| 17* | −33.829 | (Variable) | | |
| 18 | ∞ | 1.09 | 1.51633 | 64.1 |
| 19 | ∞ | 1.61 | | |
| Image plane | ∞ | | | |

Aspheric surface data

First surface

K = 0.00000e+000  A4 = −4.65961e−005  A6 = 8.04510e−007  A8 = −5.60379e−009
A10 = −1.81010e−011  A12 = 2.63709e−013

Second surface

K = 1.32245e−001  A4 = −9.53359e−005  A6 = −4.31947e−007  A8 = 2.83384e−008
A10 = −6.45846e−010  A12 = 3.74432e−012

Seventh surface

K = 0.00000e+000  A4 = −1.14474e−004  A6 = −6.39836e−007  A8 = −4.86347e−009
A10 = −3.57225e−011

Eighth surface

K = 0.00000e+000  A4 = −5.86274e−006  A6 = 2.50952e−007  A8 = −3.51576e−009

Fourteenth surface

K = 0.00000e+000  A4 = −7.75182e−005  A6 = 1.40589e−007  A8 = −1.78341e−007

Seventeenth surface

K = 0.00000e+000  A4 = 2.07327e−005  A6 = −1.89462e−007  A8 = 8.61167e−010

Various data
Zoom ratio 2.88

| | | | |
|---|---|---|---|
| Focal length | 10.40 | 15.85 | 30.00 |
| F-number | 2.06 | 3.75 | 4.90 |
| Half angle of view (degrees) | 32.34 | 26.49 | 14.75 |
| Lens total length | 51.68 | 49.51 | 55.25 |
| BF | 7.45 | 6.18 | 5.03 |

| Unit mm | | | |
|---|---|---|---|
| d4 | 17.46 | 6.72 | 1.44 |
| d6 | 0.00 | 2.63 | −0.18 |
| d15 | 7.77 | 14.97 | 29.95 |
| d17 | 5.12 | 3.85 | 2.70 |

| Zoom lens unit data | | |
|---|---|---|
| Unit | Start surface | Focal length |
| 1 | 1 | −21.26 |
| 2 | 7 | 17.13 |
| 3 | 16 | 32.89 |

| Focal length of cemented lens GRb2 | |
|---|---|
| f2bimg | 41.49 |

Embodiment 2

| Unit mm | | | | |
|---|---|---|---|---|
| Surface data | | | | |
| Surface number | r | d | nd | vd |
| 1* | −78.561 | 1.00 | 1.85135 | 40.1 |
| 2* | 12.165 | 2.80 | | |
| 3 | 18.776 | 1.70 | 1.92286 | 18.9 |
| 4 | 42.161 | (Variable) | | |
| 5 | ∞ | 0.00 | | |
| 6 (Stop) | ∞ | (Variable) | | |
| 7* | 11.768 | 2.44 | 1.88202 | 37.2 |
| 8* | −121.336 | 0.20 | | |
| 9 | 11.842 | 2.25 | 1.88300 | 40.8 |
| 10 | −54.983 | 0.50 | 1.85478 | 24.8 |
| 11 | 5.890 | 2.26 | | |
| 12 | −16.098 | 0.50 | 1.80518 | 25.5 |
| 13 | −77.129 | 1.52 | 1.85135 | 40.1 |
| 14* | −12.375 | 0.35 | | |
| 15 | ∞ | (Variable) | | (Flare cut stop) |
| 16 | 48.509 | 3.25 | 1.59201 | 67.0 |
| 17* | −29.208 | (Variable) | | |
| 18 | ∞ | 1.09 | 1.51633 | 64.1 |
| 19 | ∞ | 1.66 | | |
| Image plane | ∞ | | | |

Aspheric surface data

First surface $K = 0.00000e+000$  $A4 = -6.00714e-005$  $A6 = 9.48455e-007$  $A8 = -5.40961e-009$
$A10 = -3.59022e-011$  $A12 = 3.96262e-013$ Second surface $K = 2.11723e-001$  $A4 = -1.16286e-004$  $A6 = -2.86255e-007$  $A8 = 2.77229e-008$
$A10 = -6.32914e-010$  $A12 = 3.83216e-012$ Seventh surface $K = 0.00000e+000$  $A4 = -1.27092e-004$  $A6 = -1.64931e-006$  $A8 = 5.16661e-009$
$A10 = 4.11488e-010$ Eighth surface $K = 0.00000e+000$  $A4 = -1.70868e-005$  $A6 = -1.18433e-006$  $A8 = 4.19252e-008$ Fourteenth surface $K = 0.00000e+000$  $A4 = -1.06952e-004$  $A6 = 1.29357e-007$  $A8 = -2.96354e-007$ Seventeenth surface $K = 0.00000e+000$  $A4 = 3.41929e-005$  $A6 = -2.95225e-007$  $A8 = 1.27830e-009$ -continued

| Unit mm | | | |
|---|---|---|---|
| Various data Zoom ratio 2.89 | | | |
| | Wide angle | Intermediate | Telephoto |
| Focal length | 10.38 | 15.05 | 30.00 |
| F-number | 2.06 | 3.75 | 4.90 |
| Half angle of view (degrees) | 32.40 | 27.69 | 14.76 |
| Lens total length | 50.49 | 48.87 | 55.36 |
| BF | 7.58 | 6.46 | 5.21 |
| d4 | 16.72 | 8.04 | 1.41 |
| d6 | 0.00 | 1.79 | −0.06 |
| d15 | 7.42 | 13.79 | 30.02 |
| d17 | 5.20 | 4.09 | 2.84 |

| Zoom lens unit data | | |
|---|---|---|
| Unit | Start surface | Focal length |
| 1 | 1 | −20.83 |
| 2 | 7 | 16.91 |
| 3 | 16 | 31.28 |

| Focal length of cemented lens GRb2 | |
|---|---|
| f2bimg | 45.50 |

Embodiment 3

| Unit mm | | | | |
|---|---|---|---|---|
| Surface data | | | | |
| Surface number | r | d | nd | vd |
| 1* | −82.319 | 1.00 | 1.85135 | 40.1 |
| 2* | 12.313 | 2.85 | | |
| 3 | 18.373 | 1.67 | 1.92286 | 18.9 |
| 4 | 38.592 | (Variable) | | |
| 5 | ∞ | 0.00 | | |
| 6 (Stop) | ∞ | (Variable) | | |
| 7* | 12.294 | 2.44 | 1.88202 | 37.2 |
| 8* | −100.470 | 0.20 | | |
| 9 | 11.723 | 2.39 | 1.88300 | 40.8 |
| 10 | −39.618 | 0.50 | 1.85478 | 24.8 |
| 11 | 6.181 | 2.16 | | |
| 12 | −14.313 | 0.50 | 1.80518 | 25.5 |
| 13 | −46.991 | 1.58 | 1.85135 | 40.1 |
| 14* | −12.467 | 0.30 | | |
| 15 | ∞ | (Variable) | | (Flare cut stop) |
| 16 | 55.332 | 3.27 | 1.59201 | 67.0 |
| 17* | −26.618 | (Variable) | | |
| 18 | ∞ | 1.09 | 1.51633 | 64.1 |
| 19 | ∞ | 1.65 | | |
| Image plane | ∞ | | | |

| Aspheric surface data |
|---|
| First surface |

K = 0.00000e+000   A4 = −6.53999e−005   A6 = 1.03279e−006   A8 = −5.71107e−009
A10 = −3.78941e−011   A12 = 4.00260e−013

Second surface

K = 2.66839e−001   A4 = −1.18503e−004   A6 = −1.74807e−007   A8 = 2.73020e−008
A10 = −6.24797e−010   A12 = 3.65406e−012

Seventh surface

K = 0.00000e+000   A4 = −1.12983e−004   A6 = −7.23586e−007   A8 = 7.23036e−009
A10 = −2.33678e−010

-continued

| Unit mm |
| --- |

| Eighth surface | | | |
| --- | --- | --- | --- |
| K = 0.00000e+000 | A4 = −2.39360e−005 | A6 = 4.74398e−007 | A8 = −7.99165e−009 |
| Fourteenth surface | | | |
| K = 0.00000e+000 | A4 = −5.22401e−005 | A6 = 5.66201e−007 | A8 = −1.72658e−007 |
| Seventeenth surface | | | |
| K = 0.00000e+000 | A4 = 3.87089e−005 | A6 = −3.15568e−007 | A8 = 1.32290e−009 |

| Various data Zoom ratio 2.89 | | | |
| --- | --- | --- | --- |
| | Wide angle | Intermediate | Telephoto |
| Focal length | 10.39 | 15.11 | 30.00 |
| F-number | 2.06 | 3.75 | 5.00 |
| Half angle of view (degrees) | 32.37 | 27.61 | 14.75 |
| Lens total length | 50.42 | 48.64 | 55.22 |
| BF | 7.58 | 6.66 | 5.49 |
| d4 | 16.85 | 7.99 | 1.48 |
| d6 | 0.00 | 1.83 | −0.03 |
| d15 | 7.14 | 13.31 | 29.43 |
| d17 | 5.21 | 4.29 | 3.12 |

| Zoom lens unit data | | |
| --- | --- | --- |
| Unit | Start surface | Focal length |
| 1 | 1 | −20.93 |
| 2 | 7 | 16.81 |
| 3 | 16 | 30.81 |

| Focal length of cemented lens GRb2 | |
| --- | --- |
| f2bimg | 64.78 |

Embodiment 4

| Unit mm |
| --- |

| Surface data | | | | |
| --- | --- | --- | --- | --- |
| Surface number | r | d | nd | vd |
| 1* | −92.344 | 1.00 | 1.85135 | 40.1 |
| 2* | 10.230 | 2.60 | | |
| 3 | 16.137 | 1.99 | 1.92286 | 18.9 |
| 4 | 36.597 | (Variable) | | |
| 5 | ∞ | 0.00 | | |
| 6 (Stop) | ∞ | (Variable) | | |
| 7* | 10.512 | 2.51 | 1.85135 | 40.1 |
| 8* | 232.874 | 0.20 | | |
| 9 | 13.099 | 2.40 | 1.88300 | 40.8 |
| 10 | −27.218 | 0.45 | 1.85478 | 24.8 |
| 11 | 6.613 | 1.94 | | |
| 12 | −20.672 | 0.45 | 1.64769 | 33.8 |
| 13 | 27.508 | 1.74 | 1.88300 | 40.8 |
| 14 | −19.101 | 0.30 | | |
| 15 | ∞ | (Variable) | | (Flare cut stop) |
| 16 | 48.028 | 3.31 | 1.59201 | 67.0 |
| 17* | −23.529 | (Variable) | | |
| 18 | ∞ | 1.09 | 1.51633 | 64.1 |
| 19 | ∞ | 1.65 | | |
| Image plane | ∞ | | | |

| Aspheric surface data | |
| --- | --- |
| First surface | |

K = 0.00000e+000   A4 = −3.96667e−005   A6 = 1.38945e−006   A8 = −2.21210e−008
A10 = 1.59528e−010   A12 = −4.14457e−013

-continued

| Unit mm |
|---|
| Second surface |

K = −2.48142e−001  A4 = −1.00299e−004  A6 = 1.04700e−006  A8 = −7.61672e−009
A10 = −2.87648e−010  A12 = 2.99918e−012

Seventh surface

K = −6.51433e−003  A4 = −7.75901e−005  A6 = −1.08599e−007  A8 = 7.39574e−009

Eighth surface

K = 0.00000e+000  A4 = 3.61303e−005  A6 = 6.79170e−007

Seventeenth surface

K = 0.00000e+000  A4 = 7.38289e−005  A6 = −4.57132e−007  A8 = 1.71550e−009
A10 = 5.25214e−013

Various data
Zoom ratio 2.86

|  | Wide angle | Intermediate | Telephoto |
|---|---|---|---|
| Focal length | 9.05 | 12.80 | 25.91 |
| F-number | 2.06 | 3.85 | 5.00 |
| Half angle of view (degrees) | 36.06 | 31.68 | 16.96 |
| Lens total length | 49.34 | 47.56 | 54.21 |
| BF | 7.27 | 6.78 | 5.55 |
| d4 | 16.79 | 9.89 | 1.53 |
| d6 | 0.00 | 0.48 | 0.79 |
| d15 | 6.39 | 11.52 | 27.45 |
| d17 | 4.90 | 4.41 | 3.18 |

Zoom lens unit data

| Unit | Start surface | Focal length |
|---|---|---|
| 1 | 1 | −18.67 |
| 2 | 7 | 16.03 |
| 3 | 16 | 27.14 |

Focal length of cemented lens GRb2

| f2bimg | 40.18 |
|---|---|

Embodiment 5

| Unit mm |
|---|
| Surface data |

| Surface number | r | d | nd | vd |
|---|---|---|---|---|
| 1* | −43.194 | 1.00 | 1.85135 | 40.1 |
| 2* | 12.779 | 2.17 | | |
| 3 | 18.922 | 1.80 | 2.00272 | 19.3 |
| 4 | 47.661 | (Variable) | | |
| 5 | ∞ | 0.00 | | |
| 6 (Stop) | ∞ | (Variable) | | |
| 7* | 11.288 | 2.21 | 1.83481 | 42.7 |
| 8* | 3755.039 | 0.20 | | |
| 9 | 10.533 | 2.65 | 1.88300 | 40.8 |
| 10 | −35.004 | 0.45 | 1.85478 | 24.8 |
| 11 | 6.066 | 1.88 | | |
| 12 | −43.023 | 0.45 | 1.64769 | 33.8 |
| 13 | −70.845 | 2.10 | 1.88300 | 40.8 |
| 14 | −28.678 | 0.27 | | |
| 15 | ∞ | (Variable) | | (Flare cut stop) |
| 16 | 95.172 | 3.23 | 1.59201 | 67.0 |
| 17* | −20.729 | (Variable) | | |
| 18 | ∞ | 1.09 | 1.51633 | 64.1 |
| 19 | ∞ | 1.66 | | |
| Image plane | ∞ | | | |

-continued

Unit mm

Aspheric surface data

First surface

K = 0.00000e+000   A4 = −2.81207e−005   A6 = 1.41083e−006   A8 = −2.49004e−008
A10 = 1.76226e−010   A12 = −3.30667e−013

Second surface

K = −2.54449e−001   A4 = −6.03619e−005   A6 = 1.07517e−006   A8 = −4.98820e−009
A10 = −3.58811e−010   A12 = 4.04805e−012

Seventh surface

K = −1.45588e−001   A4 = −6.66498e−005   A6 = −2.86358e−007   A8 = 2.56849e−009

Eighth surface

K = 0.00000e+000   A4 = 5.93246e−006   A6 = 1.77846e−007

Seventeenth surface

K = 0.00000e+000   A4 = 5.14238e−005   A6 = −2.27005e−007   A8 = −1.71006e−009
A10 = 2.27206e−011

Various data
Zoom ratio 3.37

|  | Wide angle | Intermediate | Telephoto |
| --- | --- | --- | --- |
| Focal length | 10.36 | 14.32 | 34.94 |
| F-number | 2.06 | 3.56 | 5.00 |
| Half angle of view (degrees) | 32.44 | 28.88 | 12.74 |
| Lens total length | 48.40 | 47.05 | 57.59 |
| BF | 7.64 | 6.94 | 5.11 |
| d4 | 16.50 | 10.58 | 1.32 |
| d6 | 0.00 | 0.18 | −0.03 |
| d15 | 5.86 | 10.95 | 32.78 |
| d17 | 5.26 | 4.56 | 2.73 |

Zoom lens unit data

| Unit | Start surface | Focal length |
| --- | --- | --- |
| 1 | 1 | −20.35 |
| 2 | 7 | 16.01 |
| 3 | 16 | 29.05 |

Focal length of cemented lens GRb2

| f2bimg | 75.99 |
| --- | --- |

Embodiment 6

Unit mm

Surface data

| Surface number | r | d | nd | νd |
| --- | --- | --- | --- | --- |
| 1* | −149.616 | 1.00 | 1.85135 | 40.1 |
| 2* | 9.923 | 2.60 |  |  |
| 3 | 14.247 | 1.96 | 1.92286 | 18.9 |
| 4 | 25.977 | (Variable) |  |  |
| 5 | ∞ | 0.00 |  |  |
| 6 (Stop) | ∞ | (Variable) |  |  |
| 7* | 10.564 | 2.44 | 1.85135 | 40.1 |
| 8* | 130.563 | 0.20 |  |  |
| 9 | 12.238 | 2.61 | 1.88300 | 40.8 |
| 10 | −25.332 | 0.45 | 1.85478 | 24.8 |
| 11 | 6.467 | 1.60 |  |  |
| 12 | −123.980 | 0.45 | 1.71736 | 29.5 |
| 13 | 91.056 | 1.16 | 1.88300 | 40.8 |
| 14 | −32.744 | 0.38 |  |  |
| 15 | ∞ | (Variable) |  | (Flare cut stop) |
| 16 | 62.493 | 3.20 | 1.59201 | 67.0 |
| 17* | −23.900 | (Variable) |  |  |

-continued

Unit mm

| | | | | |
|---|---|---|---|---|
| 18 | ∞ | 1.09 | 1.51633 | 64.1 |
| 19 | ∞ | 1.65 | | |
| Image plane | ∞ | | | |

Aspheric surface data

First surface

K = 0.00000e+000    A4 = −3.15918e−005    A6 = 1.27248e−006    A8 = −2.08357e−008
A10 = 1.54523e−010    A12 = −3.96399e−013

Second surface

K = −2.39536e−001    A4 = −6.20719e−005    A6 = 7.46478e−007    A8 = 4.93964e−009
A10 = −5.28344e−010    A12 = 5.04254e−012

Seventh surface

K = 3.45193e−002    A4 = −7.64178e−005    A6 = −3.51226e−008    A8 = 8.98315e−009

Eighth surface

K = 0.00000e+000    A4 = 2.64384e−005    A6 = 1.00689e−006

Seventeenth surface

K = 0.00000e+000    A4 = 5.02392e−005    A6 = −4.41539e−007    A8 = 2.78134e−009
A10 = −5.90323e−012

Various data
Zoom ratio 2.87

| | Wide angle | Intermediate | Telephoto |
|---|---|---|---|
| Focal length | 9.32 | 12.60 | 26.74 |
| F-number | 2.06 | 2.50 | 5.00 |
| Half angle of view (degrees) | 35.24 | 32.09 | 16.46 |
| Lens total length | 48.63 | 47.48 | 55.22 |
| BF | 7.68 | 7.13 | 6.42 |
| d4 | 16.81 | 11.62 | 1.90 |
| d6 | 0.00 | 0.00 | 1.33 |
| d15 | 6.09 | 10.67 | 27.51 |
| d17 | 5.32 | 4.77 | 4.06 |

Zoom lens unit data

| Unit | Start surface | Focal length |
|---|---|---|
| 1 | 1 | −17.91 |
| 2 | 7 | 15.53 |
| 3 | 16 | 29.61 |

Focal length of cemented lens GRb2

| f2bimg | 43.27 |
|---|---|

TABLE 1

| | Embodiment 1 | Embodiment 2 | Embodiment 3 | Embodiment 4 | Embodiment 5 | Embodiment 6 |
|---|---|---|---|---|---|---|
| (1) | 7.75 | 7.65 | 14.51 | 25.33 | 5.00 | 1.72 |
| (2) | 2.42 | 2.69 | 3.85 | 2.51 | 4.75 | 2.79 |
| (3) | 0.05 | −1.53 | −1.88 | −0.14 | −4.09 | 0.15 |
| (4) | −8.17 | −8.57 | −9.65 | −11.19 | −9.63 | −15.99 |
| (5) | 0.52 | 0.54 | 0.55 | 0.59 | 0.55 | 0.52 |
| (6) | 0.77 | 0.81 | 0.73 | 0.61 | 0.70 | 0.59 |
| (7) | 0.80 | 0.73 | 0.74 | 0.80 | 0.54 | 0.88 |
| (8) | 0.08 | 1.38 | 1.72 | 0.18 | 2.36 | 0.47 |
| (9) | −0.48 | −0.46 | −0.40 | −0.52 | −0.75 | −0.90 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-158018, filed Aug. 10, 2015, which is hereby incorporated by reference herein in its entirety.

What is claimed is:
1. A zoom lens comprising, in order from an object side to an image side: a first lens unit having a negative refractive power; a second lens unit having a positive refractive power; and a third lens unit having a positive refractive power, a distance between the adjacent lens units varying during zooming,
wherein the second lens unit includes a plurality of lenses, a cemented lens GRb2 is disposed nearest to the image side in the second lens unit, and the cemented lens GRb2 includes a negative lens and a positive lens cemented to the image side of the negative lens, and
provided that a lens surface of the cemented lens GRb2 on the object side has a curvature radius Rb2obj, a lens surface of the cemented lens GRb2 on the image side has a curvature radius of Rb2img, the cemented lens

GRb2 has a focal length f2bimg, and a focal length of the second lens unit is f2, following conditional expressions are satisfied, $$1.65 < (Rb2obj+Rb2img)/(Rb2obj-Rb2img) < 50.00,$$

and $$1.0 < f2bimg/f2 < 10.0.$$

2. The zoom lens according to claim 1, wherein provided that a lens surface of the negative lens on the object side included in the cemented lens GRb2 has a curvature radius Rb2n_obj and a lens surface of the negative lens on the image side has a curvature radius Rb2n_img, a following conditional expression is satisfied, $$-4.5 < (Rb2n\_obj+Rb2n\_img)/(Rb2n\_obj-Rb2n\_img) < 0.2.$$

3. The zoom lens according to claim 1, wherein provided that an amount of movement of the second lens unit is M2 during zooming from a wide angle end to a telephoto end, and an amount of movement of the third lens unit during zooming from the wide angle end to the telephoto end is M3, a following conditional expression is satisfied, $$-18.0 < M2/M3 < -7.0.$$

4. The zoom lens according to claim 1, wherein provided that a focal length of the third lens unit is f3, a following conditional expression is satisfied, $$0.30 < f2/f3 < 0.65.$$

5. The zoom lens according to claim 1, wherein the second lens unit includes, in order from the object side to the image side: a positive lens; a cemented lens GRa2 including a positive lens and a negative lens cemented to each other; and a cemented lens GRb2 including a negative lens and a positive lens cemented to each other.

6. The zoom lens according to claim 5, wherein provided that a lens surface of the negative lens on the object side included in the cemented lens GRa2 has a curvature radius Ra2n_obj and a lens surface of this negative lens on the image side has a curvature radius Ra2n_img, a following conditional expression is satisfied, $$0.2 < (Ra2n\_obj+Ra2n\_img)/(Ra2n\_obj-Ra2n\_img) < 1.2.$$

7. The zoom lens according to claim 5, wherein provided that a lens surface of the positive lens on the object side included in the cemented lens GRb2 has a curvature radius Rb2p_obj, and a lens surface of this positive lens on the image side has a curvature radius Rb2p_img, a following expression is satisfied, $$0.01 < (Rb2p\_obj+Rb2p\_img)/(Rb2p\_obj-Rb2p\_img) < 2.50.$$

8. The zoom lens according to claim 5, wherein provided that a lens surface of the cemented lens GRa2 on the image side has a curvature radius Ra2n_img and a lens surface of the cemented lens GRb2 on the object side has a curvature radius Rb2n_obj, a following expression is satisfied, $$-1.0 < (Ra2n\_img+Rb2n\_obj)/(Ra2n\_img-Rb2n\_obj) < -0.3.$$

9. The zoom lens according to claim 1, wherein provided that a negative lens G1n is disposed nearest to the object side in the first lens unit, and a lens surface of the negative lens G1n on the object side has a curvature radius RG1obj and a lens surface of the negative lens G1n on the image side has a curvature radius RG1img, a following expression is satisfied, $$0.4 < (RG1obj+RG1img)/(RG1obj-RG1img) < 1.0.$$

10. The zoom lens according to claim 1, wherein an effective image diameter at a wide angle end is smaller than an effective image diameter at a telephoto end.

11. An image pickup apparatus, comprising:
a zoom lens; and
an image pickup element configured to receive an image formed by the zoom lens,
the zoom lens comprising, in order from an object side to an image side: a first lens unit having a negative refractive power; a second lens unit having a positive refractive power; and a third lens unit having a positive refractive power,
wherein a distance between adjacent lens units varies during zooming,
the second lens unit includes a plurality of lenses, a cemented lens GRb2 is disposed nearest to the image side in the second lens unit, and the cemented lens GRb2 includes a negative lens and a positive lens cemented to the image side of the negative lens, and
provided that a lens surface of the cemented lens GRb2 on the object side has a curvature radius Rb2obj, a lens surface of the cemented lens GRb2 on the image side has a curvature radius of Rb2img, the cemented lens GRb2 has a focal length f2bimg, and a focal length of the second lens unit is f2, following conditional expressions are satisfied, $$1.65 < (Rb2obj+Rb2img)/(Rb2obj-Rb2img) < 50.00,$$

and $$1.0 < f2bimg/f2 < 10.0.$$

* * * * *